United States Patent [19]

Lu

[11] Patent Number: 5,522,066
[45] Date of Patent: May 28, 1996

[54] INTERFACE FOR ACCESSING MULTIPLE RECORDS STORED IN DIFFERENT FILE SYSTEM FORMATS

[75] Inventor: Feng-Chang Lu, Tai-nang Hsiang, Taiwan

[73] Assignee: Industrial Technology Research Institute, Hsinchu, Taiwan

[21] Appl. No.: 395,532

[22] Filed: Feb. 28, 1995

Related U.S. Application Data

[63] Continuation of Ser. No. 869,725, Apr. 16, 1992, abandoned.
[51] Int. Cl.$^6$ .............................. G06F 9/00; G06F 13/00; G06F 15/00
[52] U.S. Cl. ................ 375/600; 395/200.07; 395/287; 395/843; 395/860; 364/DIG. 1; 364/282.1; 364/231.6; 364/281.3
[58] Field of Search ............................. 395/600, 200.07, 395/287, 843, 860; 364/DIG. 1

[56] References Cited

U.S. PATENT DOCUMENTS

| | | | |
|---|---|---|---|
| 4,774,655 | 9/1988 | Kollin et al. ........................... | 364/200 |
| 5,047,923 | 9/1991 | Elstner et al. .......................... | 364/200 |
| 5,058,000 | 10/1991 | Cox et al. ............................... | 364/200 |
| 5,117,349 | 5/1992 | Tirfing et al. ........................... | 395/600 |
| 5,257,366 | 10/1993 | Adair et al. ............................ | 395/600 |
| 5,278,978 | 1/1994 | Demers et al. ........................ | 395/600 |

*Primary Examiner*—Thomas G. Black
*Assistant Examiner*—Jean R. Homere
*Attorney, Agent, or Firm*—Meltzer, Lippe, Goldstein, et al.

[57] ABSTRACT

A record maintenance interface, supporting record access procedures and database access operations for a variety different file system formats, is disclosed. The record maintenance interface receives commands from the user or application requesting to access the records of a database, which are independent of the particular filing system format in which the database is organized. The procedures requested by the commands are executed and each procedure requires the performance of at least one database access operation. The record maintenance interface further maintains a program module for carrying out each database access operation for each file system. The record maintenance interface points to, and causes the execution of, a particular program module depending on the file system format of the database and the database access operation called by the record access procedure.

18 Claims, 16 Drawing Sheets

INTERFACE FOR ACCESSING MULTIPLE RECORDS STORED IN DIFFERENT FILE SYSTEM FORMATS

This is a continuation of application Ser. No. 07/869,725, filed Apr. 16, 1992, now abandoned.

FIELD OF THE INVENTION

The present invention relates to a single interface which allows computer applications to efficiently access multiple records of databases stored in a plurality of different file system formats. By means of the interface, the computer applications access the records using a single set of access procedure commands which are independent of the filing system formats in which the databases are stored.

BACKGROUND OF THE INVENTION

FIG. 1 schematically illustrates a conventional data processing machine or computer. The computer 10 comprises a processor or CPU 12, a main memory 14 and a disk memory 16 which are interconnected by a bus 18. Also connected to the bus 18 is an input device 20, such as a keyboard, as well as a display system 22. The display system 22 comprises a graphics interface 24 and display device 26 such as a CRT display.

The CPU 12 may maintain databases by storing the databases in data files in the disk memory 16. Each database may be stored in accordance with one of a plurality of file system formats. A file system format is an arrangement for organizing the data of each record of a database into a data file. The organization of the data of each record of a database within the data file controls the manner in which the database may be accessed.

Typically, the CPU 12 executes application programs which are resident in the main memory 14. An application is a program for performing a "high level" task or a task on a higher level of generality. Such "high level" tasks relate more to solving real world problems than "low level" tasks which relate more to operating the CPU 12 itself. Many applications involve the examination and alteration of the data of records of databases, which, for example, are stored in the disk memory 16. The application performs such manipulations of the data of records by means of executing record access procedures comprised therein.

Typically, procedures are program segments written for, and comprised within, an application program. Record access procedures ordinarily only access the records themselves, rather than the data files in which they are stored. For instance, record access procedures may maintain (manipulate the data of) records or permit the browsing of records, e.g., permit the display of a selected page of records. The former procedures relate to altering a record including adding and removing records from the database. The latter procedures relate to displaying selected records including filtering or displaying only selected fields of each record.

Maintenance procedures usually require the performance of at least one database access operation in order to alter or retrieve records of the database. Database access operations are generalized routines for maintaining a database, retrieving records from a database and positioning a pointer to point to a particular record within a database. Typically, the database access operations are performed by executing a program module pertaining to that particular operation and the particular file system format in which the database is stored. The file system, which has a program module for performing each database access operation, executes the appropriate program module to perform the requested access operation. The procedures of the application may call the modules, pass parameters to and receive messages and parameters therefrom. The procedures are otherwise typically isolated from the program modules and the data files in which the database is stored.

Most file systems support, i.e. can perform, the same basic set of database access operations. However, on account of the differences between different database storage formats of different file systems, the actual steps executed by each program module differ greatly. Thus, each application, although able to use the same logical sequence of each procedure, must accommodate the program modules of a variety of file systems in order to execute these procedures. Such an arrangement, whereby the applications themselves incorporate the record access procedures, is disadvantageous because:

1. The design of each application program, under this arrangement, is more time consuming and effort demanding;
2. The expansion of applications is more difficult;
3. The record access procedure command set, i.e. the set of requests for performing each record access procedure, of each application program, is not consistent with any other application; and
4. The efficiency of application software is not optimal.

The interaction of an application program with the database operations of a multiplicity of file system formats is schematically illustrated in FIG. 2. FIG. 2 schematically illustrates the group of operation program modules for three different file systems designated file system 1, file system 2 and file system 3. Each of the file systems has a corresponding group of databases in data files which accord with its own format. Each file system also provides program modules for executing database access operations such as: set current record position, get current record position, get first record, get previous record, get next record, get last record, insert one new record, delete current record, update current record, and select current record.

FIG. 2 also schematically illustrates two application programs, designated application A and application B. Application A interacts directly with the file system 1 and file system 2 program modules and application B interacts directly with the file system 2 and file system 3 program modules. As such, application A incorporates record access procedures which support, i.e. can cause the execution of, the database access operation program modules of file systems 1 and 2. Application B, on the other hand, incorporates record access procedures which support the database access operation program modules of file systems 2 and 3. As indicated above, the direct interaction of the application programs with the file system program modules is highly deleterious and duplicative.

Accordingly, it is an object of the present invention to provide a common interface by which application programs may perform record access procedures which support, i.e. can perform, database access operations for any one of a plurality of file system formats. Another object of the present invention is to insulate the applications from the various file system program modules. It is a further object of the present invention to provide a universal record maintenance procedure command set, i.e. a single set of messages for performing each record access procedure, which may be used by any application.

SUMMARY OF THE INVENTION

As indicated above, in a data processing machine, a user application often needs to access the records of databases stored in accordance with any one of a plurality of file system formats. Records are manipulated by record access procedures which in turn require the performance of database access operations. Each file system incorporates many of the same database access operations. However, because of differences in the actual data storage formats used by different file systems, these similar database access operations are executed in very different manners. This requires the record maintenance procedures to accommodate many different program modules to effect the same data access operation for different file system formats.

The present invention provides a record maintenance interface which has a group of procedures including a set of record access procedures. The record access procedures support, i.e., can perform, a set of database access operations by maintaining program modules for a variety different file system formats. The record maintenance interface receives commands, or messages requesting the execution of particular record access procedures, from the user or application. These commands are from a single set and are independent of the particular filing system format in which the database is organized. Illustratively, commands to execute the following record access procedures may be received by the record maintenance interface:

(a) Browsing procedures
   Move Up One Line
   Move Down One Line
   Move To Top Of Page
   Move To End Of Page
   Scroll One Page Up
   Scroll One Page Down
   Display From Top Of File
   Display From End Of File (b) Record maintenance procedures
   Insert One Output Line
   Delete Current Line
   Update Current Line Select Current Line In the execution of these procedures one or more database access operations may also be performed such as:

(a) Record positioning operations
   Get Current Record Position
   Set Current Record Position (b) Record retrieval operations
   Get First Record
   Get Previous Record
   Get Next Record
   Get Last Record
   Get Current Record (c) Record maintenance operations
   Insert One New Record
   Delete Current Record
   Update Current Record
   Select Current Record Illustratively, the record access procedures are requested by commands or messages issued from an input/output device, such as a keyboard and display system, or by an application. When a command is received by the record maintenance interface (RMI), the requested record access procedure is executed by a CPU. The execution of a record access procedure may require the performance of one or more database access operations. If such is the case, the RMI points to the specific program module that must be executed. The program module is selected in accordance with the file system format of the database and the desired operation to be carried out. The specific program module is then executed by the CPU of the data processing machine.

In the execution of various procedures, including the record access procedures, different messages may be generated. Some relate to an error condition triggered by the failed attempt to perform a step such as a failed attempt to execute a program module. Other messages merely communicate the effect of the successful execution of the requested record access procedure on the record or database of interest. The RMI illustratively communicates messages relating to the execution of procedures to the input/output device or application.

Use of the RMI of the present invention has a number of significant advantages:

1. The application program is easier to maintain as the application programmer need not maintain the database interface aspect of the program. Further, as the record management interface is updated, the database aspect of each user application is automatically updated or subsequently easily updated.

2. Record access procedures occur on a higher level of generality. In other words, the programmer need not be concerned with the particulars of designing any of the procedures of the interface. Further, the programmer need not be concerned with determining which filing system formats to support, i.e. which file system program modules to incorporate.

3. The user and programmer need only learn one general set of record access procedure commands rather than a set for each application.

4. The storage space of each application which performs record access procedures is reduced as the record access procedures are removed and consolidated in one program.

BRIEF DESCRIPTION OF THE DRAWINGS

FIG. 18 is a flow chart illustrating the steps for pointing to the program module of a particular file system for any database access operation.

DETAILED DESCRIPTION OF THE INVENTION

Figure 3A:
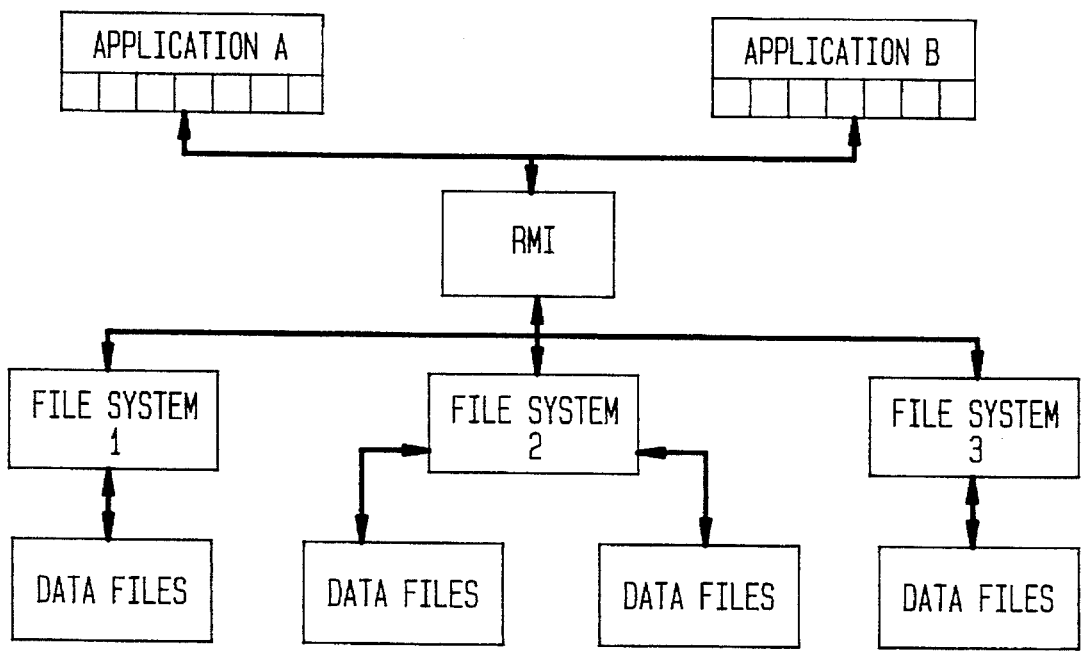
FIG. 3A schematically illustrates the interaction of application programs with databases of multiple file system formats via a record maintenance interface.

FIG. 3A schematically depicts the interaction of two application programs denoted application A and application B with databases stored in data files. These data files are stored in one of three file system formats denoted file system 1, file system 2 and file system 3. The interaction with the databases is via a record management interface (RMI).

Figure 1:
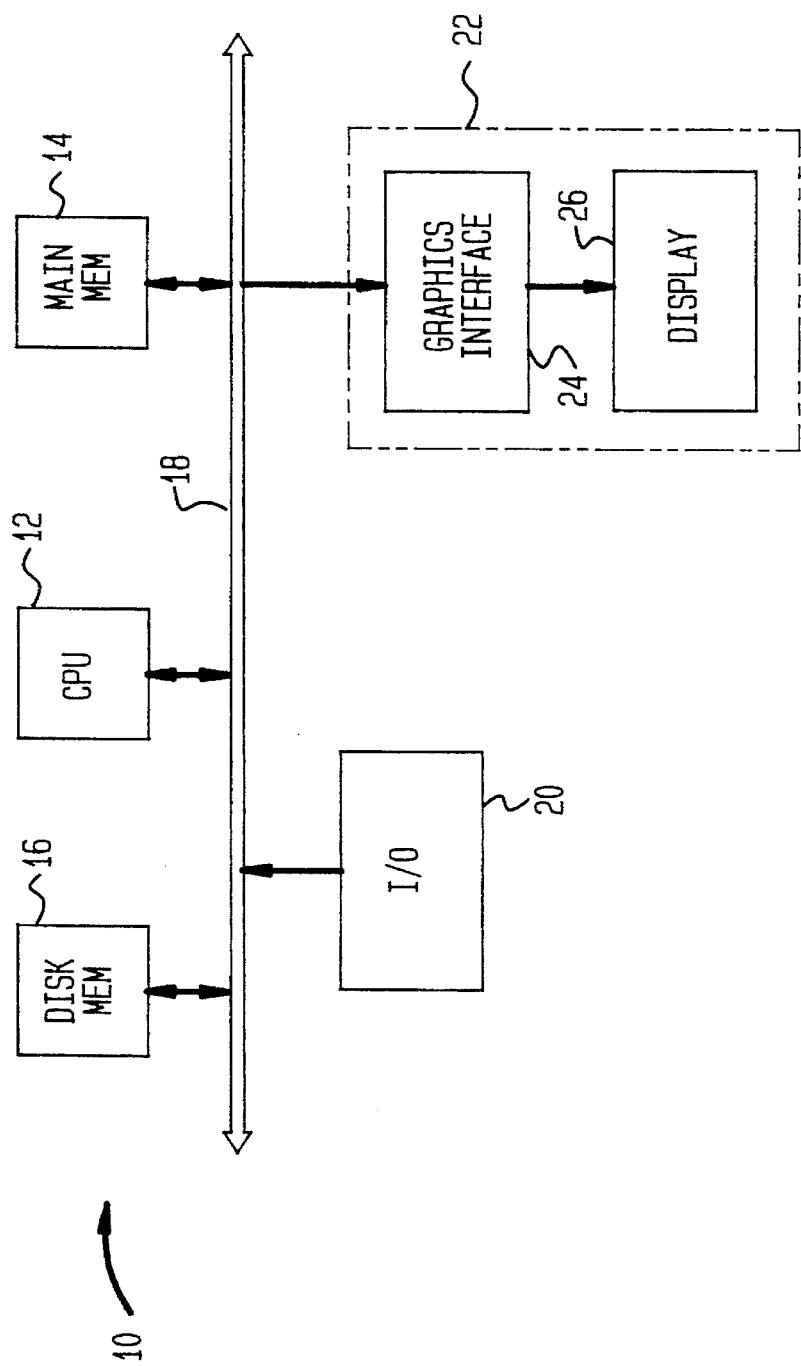
FIG. 1 depicts a conventional data processing machine.
Figure 2:
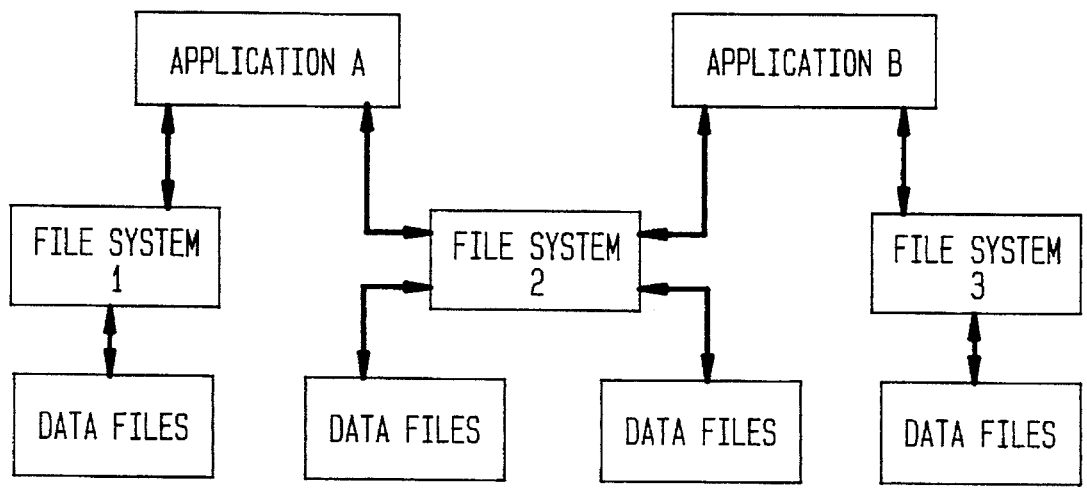
FIG. 2 schematically illustrates the traditional interaction of application programs and databases of multiple file system formats.
Figure 3B:
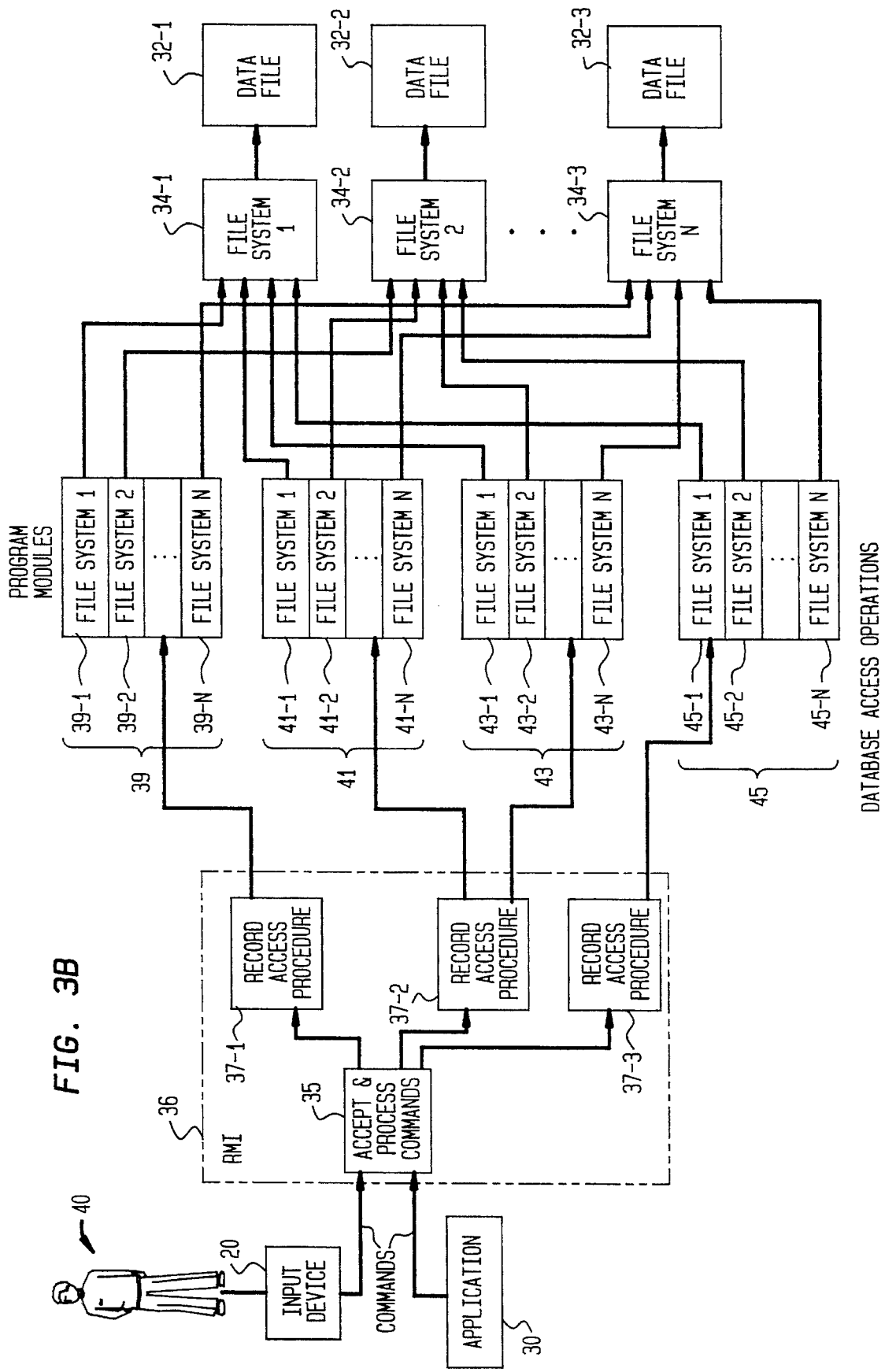
FIG. 3B schematically illustrates the performance of a record access operation of an application interacting with a record maintenance interface.

FIG. 3B schematically depicts the execution of an application and its interrelationship with the RMI. The application 30 or user 40 via an input device 20 (FIG. 1), issues a command or message requesting the execution of a particular record access procedure. The record access procedures are stored in the CPU 12, main memory 14 or disk memory 16 (FIG. 1). Preferably, they are stored in the main memory 14 (FIG. 1). These commands are received by the RMI 36 and processed by an Accept and Process Commands procedure 35 comprised therein. The execution of the Accept and Process Commands procedure 35 by the CPU 12 (FIG. 1) is discussed in greater detail below. The requested procedure 37-1, 37-2 or 37-3, i.e., the record access procedure corresponding to the issued command, is then executed by the CPU 12 (FIG. 1).

The execution of the procedures 37-1 to 37-3 may require the performance of at least one database access operation 39, 41, 43, 45. In order to perform a particular database access operation 39, 41, 43 or 45, the particular program module 39-1, ..., 39-N, 41-1, ..., 41-N, 43-1, ..., 43-N, 45-1, ..., 45-N of the file system 32-1, 32-2 or 32-3 in which the database is stored, and which performs the desired operation 39, 41, 43 or 45, must be executed by the CPU 12 (FIG. 1). For example, to perform the database access operation 39 on a database maintained by the file system 34-2, the program module 39-2 is selected and executed. The program modules may be stored in the CPU 12 (FIG. 1), the main memory 14 (FIG. 1) or the disk memory 16 (FIG. 1). Typically, they are stored in the disk memory 16 (FIG. 1). The RMI 36 points to the location of the program module 39-1, ..., 39-N, 41-1, ..., 41-N, 43-1, ..., 43-N, 45-1, ..., 45-N pertaining to the file system 34-1, 34-2 or 34-3 which maintains the database of interest of the desired operation 39, 41, 43 or 45 and issues a request to the CPU 12 (FIG. 1) to execute it. The CPU 12 (FIG. 1) then executes the program module 39-1, ..., 39-N, 41-1, ..., 41-N, 43-1, ..., 43-N, 45-1, ..., 45-N of the file system 34-1, 34-2 or 34-3 pointed to by the RMI. This program module 39-1, ..., 39-N, 41-1, ..., 41-N, 43-1, ..., 43-N, 45-1, ..., 45-N accesses a database stored in the data file 32-1, 32-2 or 32-3 maintained by the file system 34-1, 34-2 or 34-3.

Figure 4:
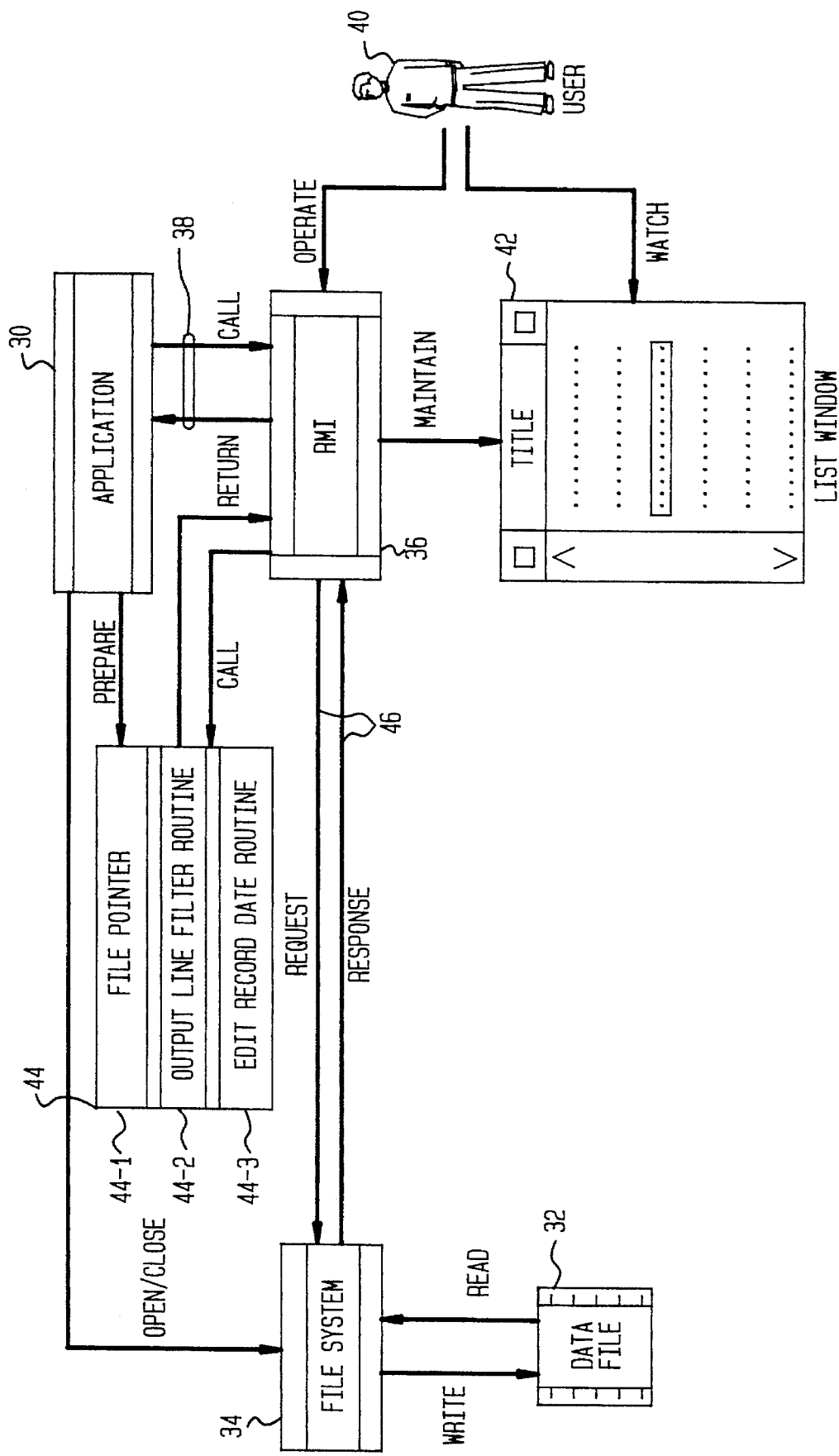
FIG. 4 schematically illustrates, with greater detail, the interaction of an application program with the record maintenance interface.

Referring now to FIG. 4, the interaction of the RMI 36 with an application 30 or user 40 is schematically illustrated in greater detail. An application 30 or user 40 first opens the data file 32 containing the records of interest. This is achieved by issuing an "open" request to the CPU 12 (see FIG. 1). In response to a successful execution of the open command, a file pointer pointing the opened file is returned to the application 30 or user 40. The application 30 or user 40 transmits this pointer to the RMI 36 which maintains it as depicted in block 44-1. Also, the application 30 or user 40 prepares the Edit Record Data and Filter Record procedures. In this manner, the user 40 or application 30 may select one of a plurality of Edit Record Data and Filter Record procedures supported by the RMI 36 for use in a particular session. These procedures, depicted in blocks 40-2 and 40-3 will be discussed in greater detail below.

After opening the file 32, the application 30 may perform record access procedures by issuing commands from a file system independent set to the RMI 36 via a first communication channel 38. In response thereto, the RMI 36 executes procedures, including the requested procedures, and communicates various messages back to the application 30 via the first communication channel 38.

Alternatively, the RMI 36 may be executed in an interactive session with the user 40 via the input device 20 (see FIG. 1) and display system 22 (see FIG. 1). In such a case, as discussed in greater detail below, the RMI 36 maintains a list window 42 on the display device 26 (FIG. 1). The RMI 36 receives commands from the user 40 via the input device 20 (FIG. 1) and communicates messages back to the user 40 via the list window 42.

Upon receiving a command from either the application 30 or the user 40, the RMI 36 executes, among other procedures, the requested record access procedure. As depicted in the block 44, at least two procedures are maintained in the computer 10 (FIG. 1) by the RMI 36, an Edit Record Data procedure 44-3 and an Output Line Filter procedure 44-2. These procedures, and others will be discussed in greater detail below.

In the execution of a record access procedure, a database operation may also need to be performed. In such a case, the RMI 36 points to the appropriate database access operation program module. The module is selected depending on the desired data access operation and the file system format 34 in which the database containing the record of interest is stored.

After pointing to a particular program module, the RMI 36 then issues a request to the CPU 12 (FIG. 1) via a second communication channel 46 to execute it. Upon the successful execution of the program module, a message may be returned to the RMI 36 such as a record retrieved from the data file 32. Alternatively, the RMI 36 may receive an error message indicating a failed attempt to execute a program module. These messages are transmitted by the CPU 12 (FIG. 1) via the same communication channel 46.

When the application 30 or user 40 desires to cease using the RMI 36 the user 40 or application 30 issues a "close" command to the CPU 12 (FIG. 1). This closes the data file 32 used during the session. With the exception of opening and closing the data files, the user 40 or application 30 is isolated from the low-level detail of accessing the database.

Thus, an application program 30, or the user 40 in an interactive session, may access the records of a database using the RMI 36. The access procedures provided by the RMI 36 include browsing the records of a database, updating the records of a database and inserting or deleting new records into a database. The operation of the RMI 36 and these procedures is discussed in greater detail below.

Figure 5:
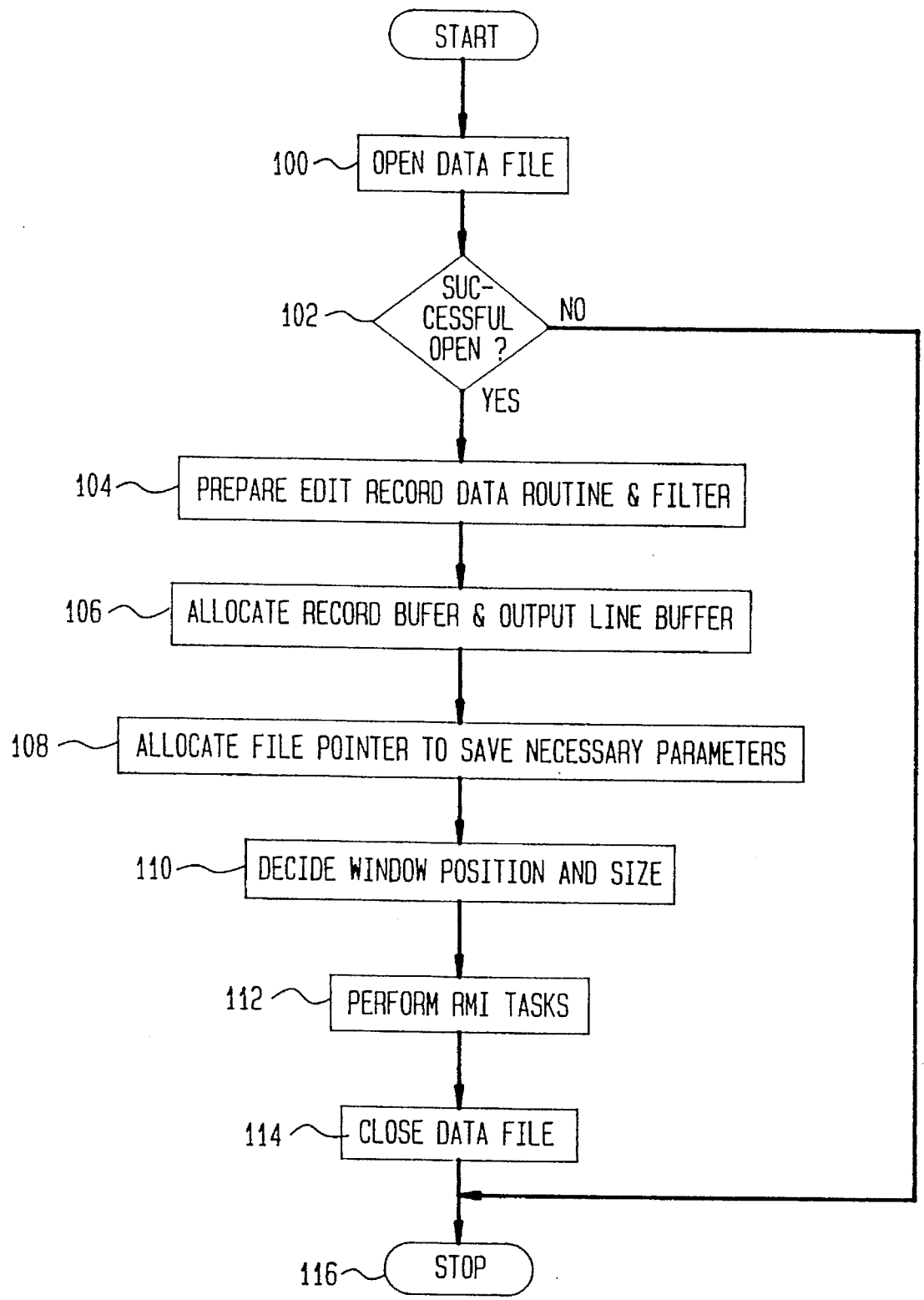
FIG. 5 depicts a flow chart illustrating the Main procedure.

Turning now to FIG. 5, an exemplary Main procedure or program segment of an application 30 is schematically illustrated. This procedure is initiated by the application 30. Execution begins with step 100 where the data file 32 (FIG. 4) containing the database of interest is opened by the application program 30 (FIG. 4) or user 40 (FIG. 4). Next execution proceeds to step 102 where it is determined if the file was successfully opened. If not, execution of the Main procedure jumps to step 116 and ceases. If the database file was successfully opened, execution continues with step 104 where the Edit Record Data and Filter Record procedures are prepared. These procedures are discussed in greater detail below. Execution then continues with step 106 where space for a record buffer and output line variable are allocated. Since a particular record may be of any length, a variable storage space must be allocated for temporarily storing records. Additionally, the output line variable will also be of variable length depending upon the mode of execution. If an application program 30 (FIG. 4) will receive the output, then the output line variable needs to support the display of an output line of any length. If the RMI 36 (FIG. 4) is executed in user interactive mode, the output line variable must support the width of one line which may be displayed in the list window 42 (FIG. 4) defined by the user 40 (FIG. 4). As such, the length of the output line will vary and space must be allocated appropriately.

Execution next continues with the step 108 where a file pointer for saving parameters is allocated. The allocation of the file pointer depends upon what parameters are associated with each data file of a particular file system format. For instance, the Btrieve file system format requires allocation for the following parameters: the position block, record buffer address, record buffer length, key buffer address and key. Thus, in this step 108, the Main procedure allocates space for the file pointer parameters in accordance with the file system format of the particular opened data file.

After allocating the file pointer, execution then proceeds to step 110 where the Main procedure determines the dimensions and location of the list window 42 (FIG. 4) (if in user interactive mode). Preferably, the user 40 (FIG. 4) is queried via the display device 26 (FIG. 1) as to the height and width of the list window 42 (FIG. 4) and its location. In response thereto, the user 40 (FIG. 4) enters via the input device 20 (FIG. 1) the desired dimensions and coordinates. The RMI 36 (FIG. 4) then opens a list window 42 (FIG. 4) on the display device 26 (FIG. 1) for communicating the status of executed procedures, including record access procedures, to the user 40 (FIG. 4).

Execution next proceeds to step 112, where the Main procedure initiates the RMI 36 (FIG. 4). Therein, the RMI 36 (FIG. 4) receives record access procedure commands from the user 40 (FIG. 4) via the input device 20 (FIG. 1) or the application 30 (FIG. 4) via a first communication channel 38 (FIG. 4). The execution of this procedure will be discussed in greater detail below. The RMI 36 (FIG. 4) communicates the status of requested procedures to the user 40 (FIG. 4) via the list window 42 (FIG. 4) or to the application 30 (FIG. 4) via the communication channel 38 (FIG. 4). The RMI 36 (FIG. 4) is executed until the user 40 (FIG. 4) or the application 30 (FIG. 4) decides to end the session. Execution then returns to the Main procedure at step 114 whereby all opened data files are closed by the user 40 (FIG. 4) or application 30 (FIG. 4). Execution then proceeds to step 116 of the Main procedure and ceases.

Figure 6:
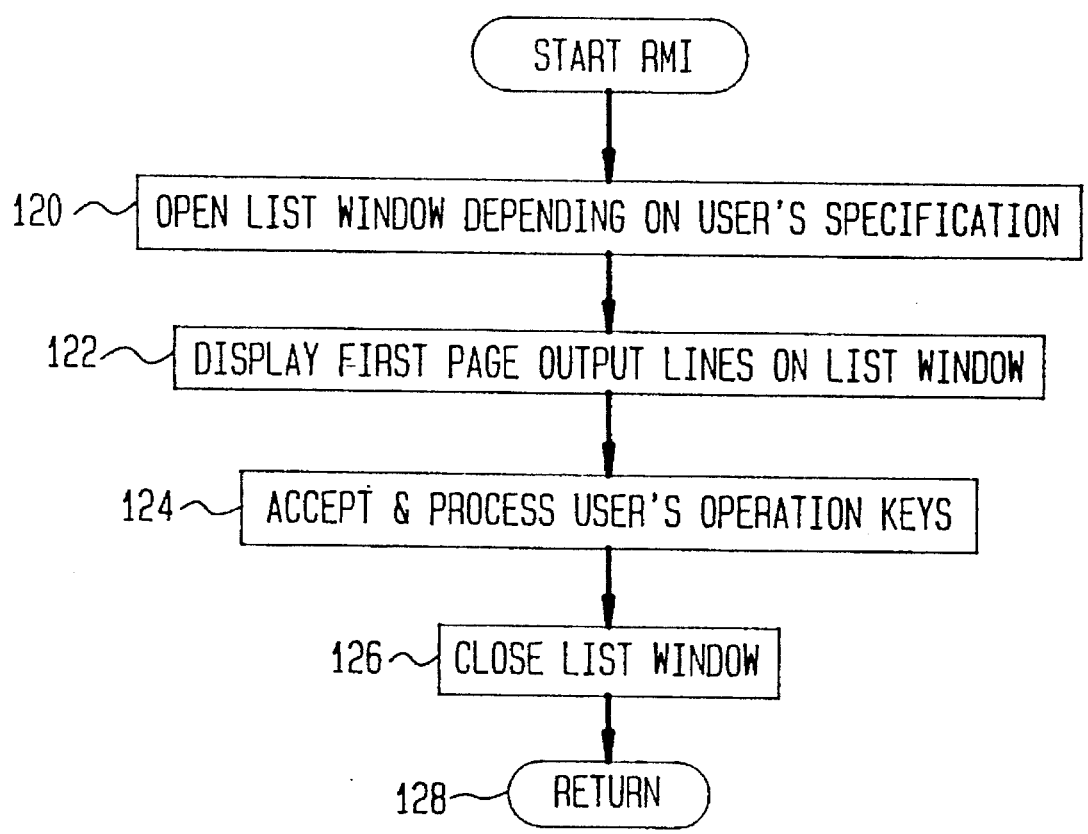
FIG. 6 is a flow chart illustrating the execution of the RMI.

Turning now to FIG. 6, execution of the RMI (called in step 112 of FIG. 5) is schematically shown in greater detail. Upon the calling of the RMI, execution begins at step 120 where a list window 42 (FIG. 4) is opened in accordance with the specifications (i.e., position and dimensions) entered by the user 40 (FIG. 4) at step 110 (see FIG. 5). In the case of user 40 (FIG. 4) interaction, the RMI 36 (FIG. 4) transmits messages to the list window 42 (FIG. 4) of the display device 26 (FIG. 1). Execution then continues with step 122 where the first page of output lines is placed in the list window 42 (FIG. 4) by executing the procedure Display One Page Of Output Lines for the first page. Execution of this procedure will be discussed in greater detail below.

Next, step 123 is executed wherein the active line variable is set to "1" or the first line. This variable is used in user interactive mode for highlighting the record of interest in the window, i.e., the record which the user 40 desires to examine or edit. Initially, as will be discussed below, the first page of records is displayed in the list window 42 (FIG. 4). As such, it makes sense to initially point to the first record (which is initially displayed on line "1").

Execution then continues with step 124 where the user 40 (FIG. 4) or application 30 (FIG. 4) commands are accepted by the RMI 36 (FIG. 4) and processed. As will be discussed in greater detail below, the user 40 (FIG. 4) or application 30 (FIG. 4) may request one of a number of record browsing or maintenance procedures by issuing the appropriate command. The RMI 36 (FIG. 4) accepts these commands and executes the requested record access procedures until the user 40 or application 30 (FIG. 4) desires to end the session. Execution then continues with step 126 where the list window 42 (FIG. 4), if opened, is closed. Thereafter, in step 128, execution of the RMI ceases and execution control returns to step 114 of the Main procedure (see FIG. 5).

Figure 7:
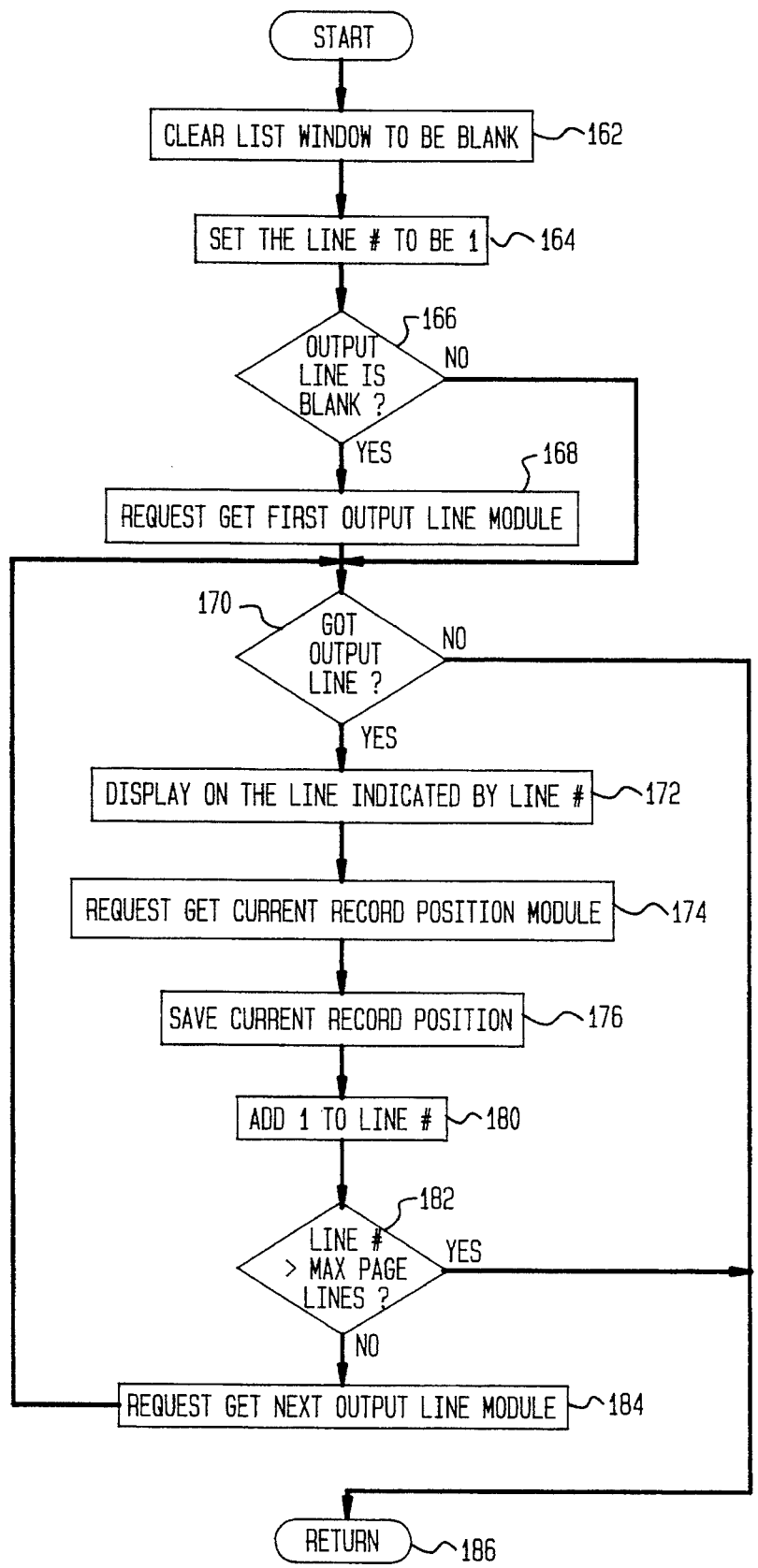
FIG. 7 is a flow chart illustrating the Display One Page procedure.

In FIG. 7 the Display One Page Of Output Lines procedure (which is executed in step 122 of FIG. 6, for instance) is schematically illustrated in greater detail. This procedure is executed in conjunction with the user interactive mode of operating the RMI 36 (FIG. 4). This procedure actually outputs the examined records for display in the list window 42 (FIG. 4) and comprises the following steps. The list window 42 (FIG. 4) is cleared in a first step 162. Execution then continues with step 164 in which a line number counter is set to one. This counter is used to indicate the next line of the list window 42 (FIG. 4) which is to receive record data for display.

Execution then continues with step 166 which determines whether the output line variable is currently blank. This variable is used to temporarily store formatted record data to be displayed on one line of the list window 42 (FIG. 4) (the formatting of record data is discussed in greater detail below). If this variable is blank then either no records in the database of interest have yet been displayed (or retrieved) or the end of the database has been reached. In either case, it is desireable to display the first page of output lines (i.e., a page of the first group of records of the database). Hence, if the output line variable is blank, then execution continues with step 168 in which the Get First Output Line procedure is executed. Otherwise, execution continues with step 170.

As will be discussed in greater detail below, the Get First Output Line procedure performs several steps including returning a formatted output line, which is placed into the output line variable, if its execution was successful.

In the step 170, a determination is made as to whether there is an output line to be displayed. The determination must be affirmative if the output line was determined not to be blank at the step 166. However, in the case that the line was blank at step 166 a subsequent determination is made to determine if the Get First Output Line procedure was successful in obtaining a formatted output line for display. If there is no output line to be displayed, execution jumps to step 186 and the Display One Page Of Output Lines procedure ends.

If there is an output line for display, then execution proceeds to step 172. In this step 172, the formatted output line, that is, the contents of the output line variable, are displayed on the line of the display device 26 (see FIG. 1) indicated by the line number variable. Execution then continues with step 174 where the database access operation Get Current Record Position is performed. This operation is one of the basic database operation supported by all file systems. As such, the RMI 36 (FIG. 4) points to the particular Get Current Record Position module pertaining to the file system format in which the database of the records of interest is stored. This selection process will be discussed in greater detail below. The purpose of this operation is to enable the RMI 36 (FIG. 4) to keep track of the current record of interest. Preferably, in the user interactive mode, the RMI 36 (FIG. 4) indicates the record of interest to the user 40 (FIG. 4) by highlighting it on the display device 26 (see FIG. 11).

Execution then continues with step 176 where the current record position, returned by the Get Current Record Position module, is temporarily stored. Should the user 40 (FIG. 4) or application 30 (FIG. 4) desire to alter a record, the RMI 36 (FIG. 4) can use this record position value to cause the execution of the changes on the desired record of the database. Execution then continues with step 180 where the line counter is incremented. At this point it is desireable to determine whether the list window 42 (FIG. 40), as dimensioned by the user 40 (FIG. 4), can display another line. Thus, in line 182 such a determination is made by comparing the line number counter to the maximum number of page lines supported by the list window 42 (FIG. 4). If this maximum number is exceeded then execution continues with step 186 in which execution of the Display One Page Of Output Lines procedure ceases and returns to the procedure from which it was called.

If more lines can be displayed, execution continues with step 184 where the Get Next Output Line procedure is executed. As will be discussed in greater detail below, this procedure retrieves the next record and causes it to be filtered (also discussed in greater detail below). After step 184, execution loops back to step 170 in which a determination is made as to whether a formatted output line is available for display. In this case, step 170 determines if the Get Next Output Line procedure was successful. Thus, execution loops through steps 170 through 184 until either no more output lines are available for display or no more lines of data may be displayed in the list window 42 (FIG. 4).

Figure 8:
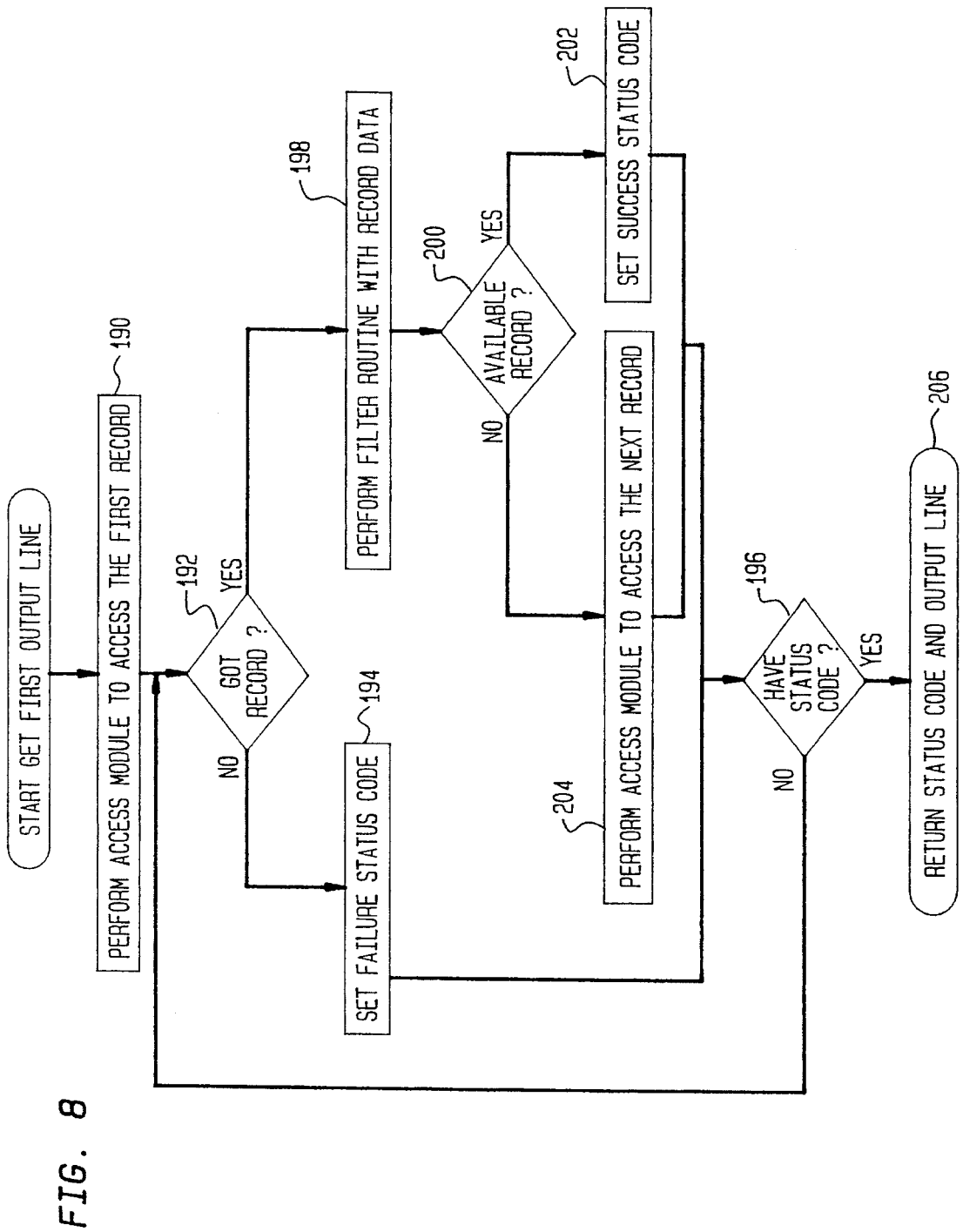
FIG. 8 is a flow chart illustrating the Get First Output Line procedure.

Turning now to FIG. 8 the Get First Output Line procedure (executed, for example, by step 168 of FIG. 7) is schematically shown in greater detail. First, step 190 is executed in which the Get First Record module, pertaining to the file system format of the database containing the record of interest, is pointed to and executed. Again, as with all program modules, the Get First Record module is selected in accordance with the particular file system format of the database. This selection process will be discussed in greater detail below. The Get First Record operation returns the first record of the database.

Execution next proceeds with step 192 in which the CPU 12 (FIG. 4) determines whether the execution of the Get First Record operation of step 190, moved the internal file system pointer to the end of the data file. If the end of the file 32 (FIG. 4) was reached, meaning that no records subsequent to the last accessed record exist in the data file 32 (FIG. 4), execution proceeds to step 200 and ceases. If not, then execution continues with step 194 in which the Filter Record procedure, which will be discussed in greater detail below, is executed. The Filter Record procedure extracts the data of particular fields of interest from a record and returns the data in a formatted output line.

Next, in step 196 it is determined whether the Filter Record procedure has returned a formatted output line. If not, this indicates that a blank record was read from the database and the module Get Next Record module is pointed to and executed in step 98. Again, as with all program modules, the particular program module pointed to is selected in accordance with the file system of the database and will be discussed in greater detail below. This operation retrieves the next record of the database. If in step 196 a formatted record is returned then execution continues with step 200.

Execution from steps 192 or 196 continues with step 200 where the procedure ends or remains locked in the loop of steps 192–198. Execution remains in this loop only in the case that a blank record was read and the end of the file 32 (FIG. 4) has not been reached. This proceeding through steps 192–198 will continue for each blank record retrieved from the database. Finally, either the end of the data file 32 (FIG. 4) will be reached (and execution will branch to step 200 via step 192) or a non-blank record will be retrieved (and execution will branch to step 200 via step 196). Thus, all blank records are skipped by this procedure and only records with data are returned.

If either a non-blank record is retrieved or the end of the file is reached, execution proceeds to step 200 in which the Get First Output Line procedure ends. Execution then returns to the calling procedure. Additionally, a formatted output line (if the procedure was successful) is returned.

Figure 9:
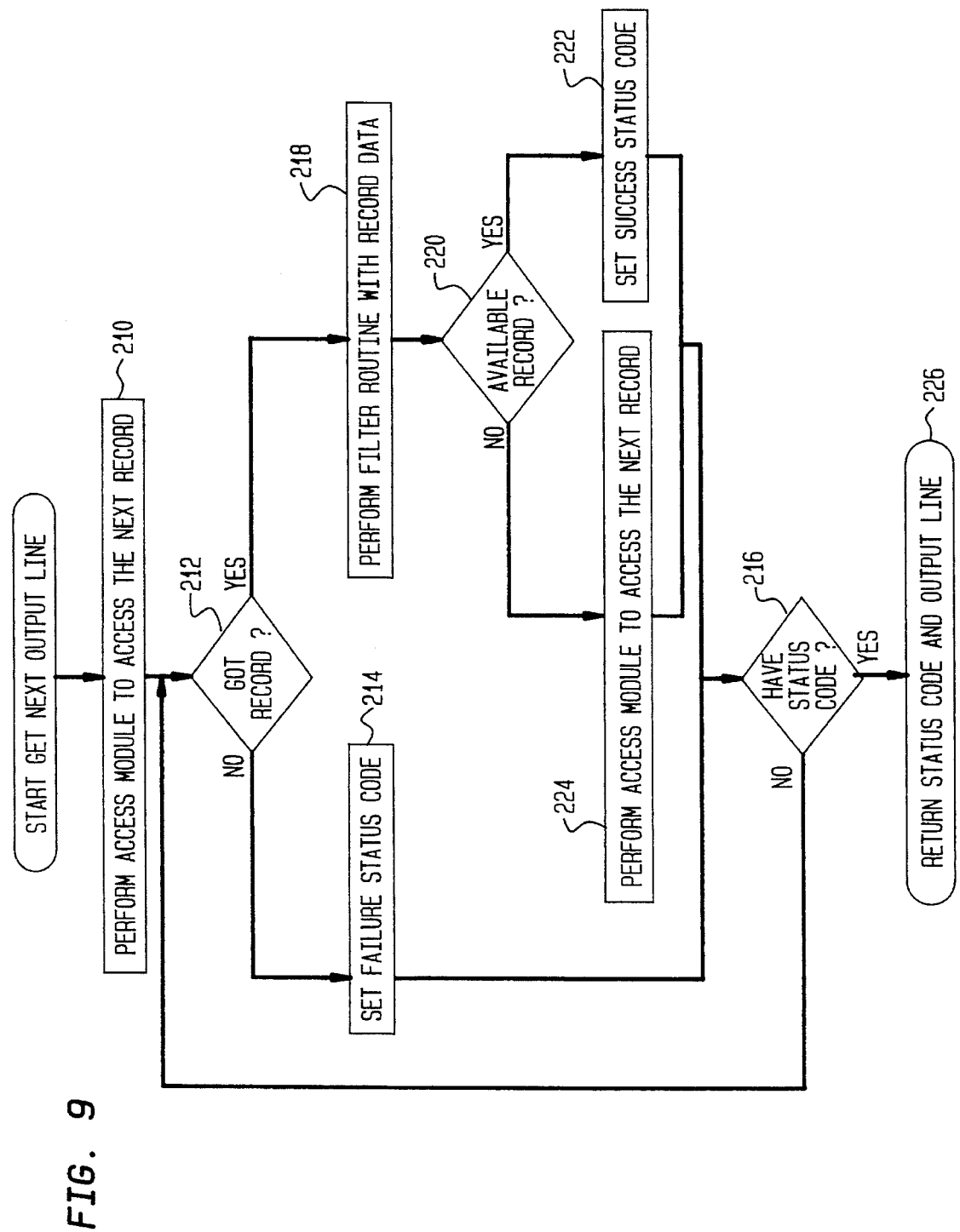
FIG. 9 is a flow chart illustrating the Get Next Output Line procedure.

Turning now to FIG. 9 the Get Next Output Line procedure (called, for example in step 184 of FIG. 7) is schematically shown in greater detail. In many ways, the Get Next Output Line procedure is similar to the Get First Output Line procedure shown in FIG. 8. In the first step 210 of the Get Next Output Line procedure, the Get Next Record module is pointed to and executed. As with the other modules, the Get Next Record module is selected in accordance with the particular file system format of the database which contains the records of interest. This selection process will be discussed in greater detail below. The Get Next Record operation retrieves the next record of the database. Execution next proceeds with step 212 in which it is determined whether the end of the file 32 (FIG. 4) was reached by the Get Next Record operation of step 210. If so, execution continues with step 218 and returns to the calling procedure. If not, then a record was retrieved. In such a case, execution continues with step 214 in which the Filter Record procedure is executed. Again, the Filter Record procedure, which extracts particular data fields from a record and places them in a formatted output line variable, will be discussed in greater detail below.

Next in step, 216 it is determined whether the Filter Record procedure has returned a formatted output line. If not, this indicates that a blank record was read from the database and execution loops back to the module Get Next Record step 210. If a formatted record is returned then execution continues with step 218 where execution of the Get Next Output Line Procedure ceases.

Execution from steps 212 or 216 continues to step 218 only in the case that a non-blank record was read or the end of the file has been reached. In such a case, it is desirable to cease execution and return the formatted line (in the case of a non-blank record). On the other hand, if both a blank record is returned and the end of file has not been reached, then execution is locked into the loop of steps 210–216. Finally, either the end of the data file 32 (FIG. 4) will be reached or a non-blank record will be retrieved. Thus, all blank records are skipped by this procedure and only records with data are returned.

Figure 10:
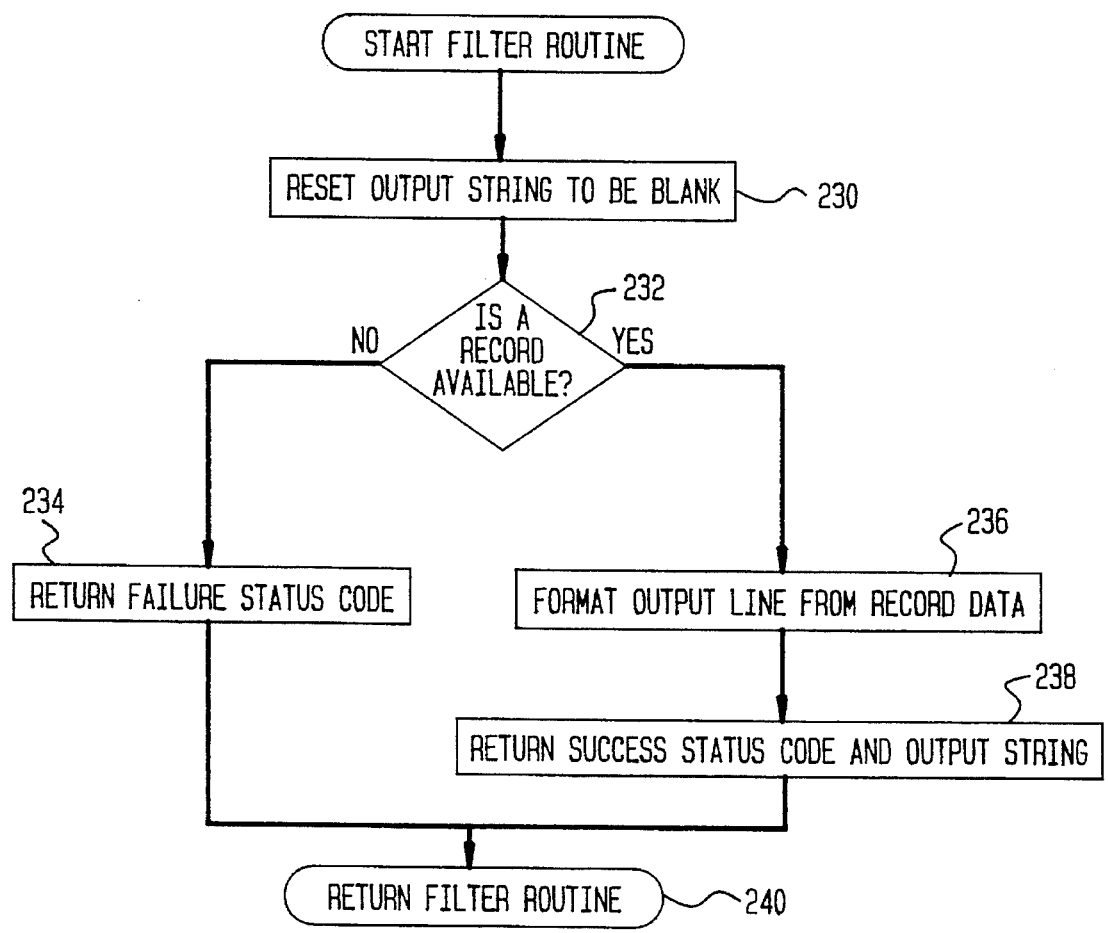
FIG. 10 is a flow chart illustrating the Filter Record procedure.

The execution of the Filter Record procedure (called, for example, in step 218 of FIG. 9) will now be discussed. In FIG. 10 the Filter procedure is schematically illustrated in greater detail. Execution begins with step 230 in which the formatted output line variable, used to hold the formatted output line to be displayed in the list window 42 (FIG. 4), is cleared. Execution then continues with step 232 in which a determination is made as to whether a record is available from which data may be extracted. If not, execution proceeds to step 234 in which a "failure" status code is set and thence to step 240 in which execution of the Filter Record procedure ends.

Figure 11:
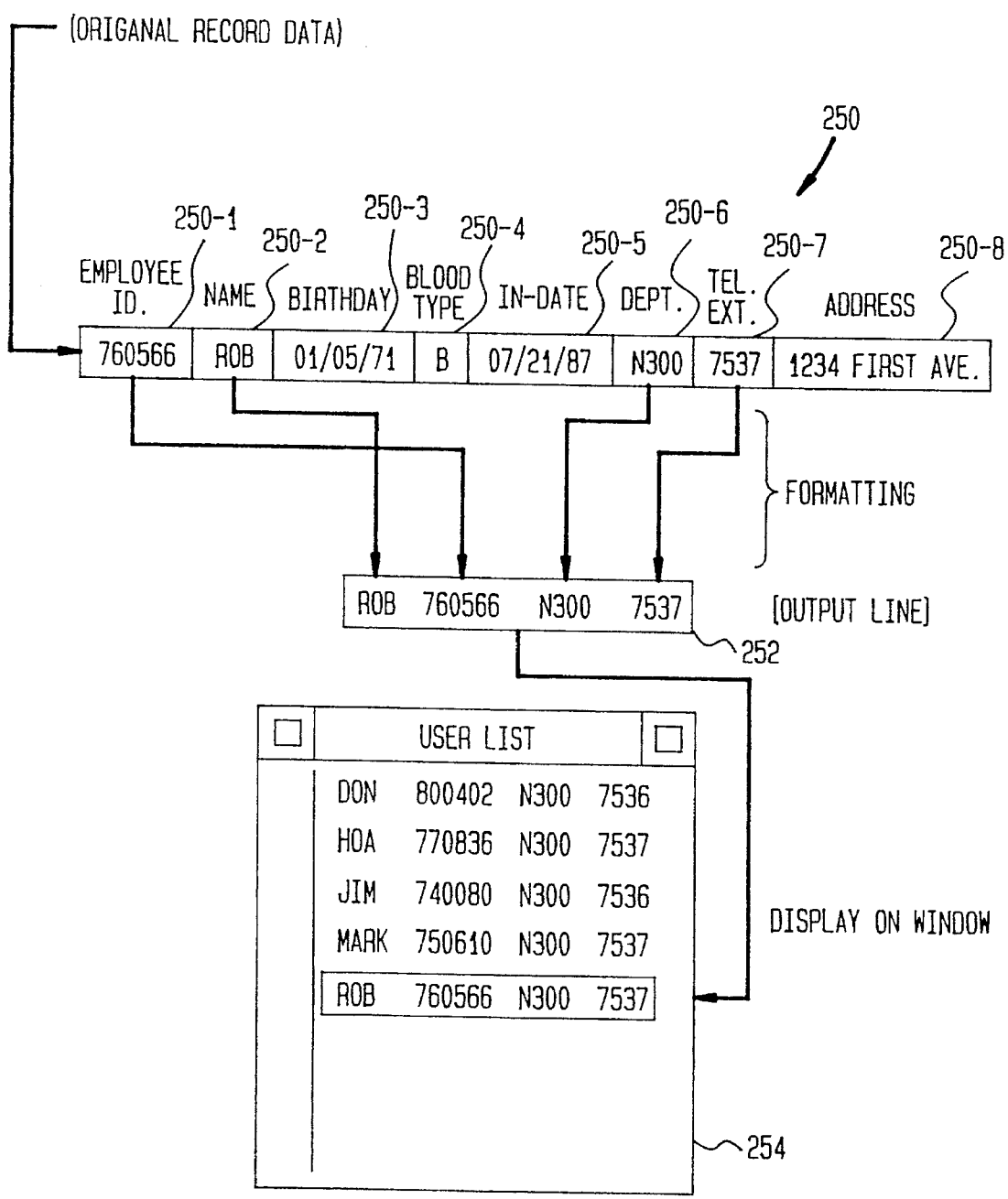
FIG. 11 illustrates the formatting of an output line by the Filter Record procedure.

If a record is available, execution proceeds to step 236 in which the output line is formatted from the record data. In this step, data is selectively extracted from particular fields of the record, in accordance with a user 40 (FIG. 4) or application 30 (FIG. 4) specified scheme. Referring to FIG. 11, the results of such a formatting step is schematically depicted. As depicted in FIG. 11, an exemplary record 250 from an employee database is illustratively shown having eight data fields 250-1 to 250-8. These fields 250-1 to 250-8 respectively store the identification number, name, birth date, blood type, in-date, department, telephone number and address for a particular employee.

The format operation extracts the data of certain fields 250-1 to 250-8 and assembles an output line in accordance with a user 40 (FIG. 4) or application 30 (FIG. 4) specified scheme. As depicted by box 252, the user 40 (FIG. 4) or application 30 (FIG. 4) has indicated the desire to receive the employee name 250-2, identification number 250-1, department 250-6 and telephone number 250-7 fields, in that order. Accordingly, the format step 236 produces the output line 252 as depicted in FIG. 11. This formatted output line 252 would appear as shown in a list window 254.

Returning now to FIG. 10, after step 236, execution continues with step 238. In step 238, a "success" status code is set and returned along with the formatted output line hereinabove described. Finally, execution from either step 234 or step 238 proceeds to step 240 where execution of the Filter Record procedure ceases and control returns to the procedure from which the Filter Record procedure was called.

Figure 12:
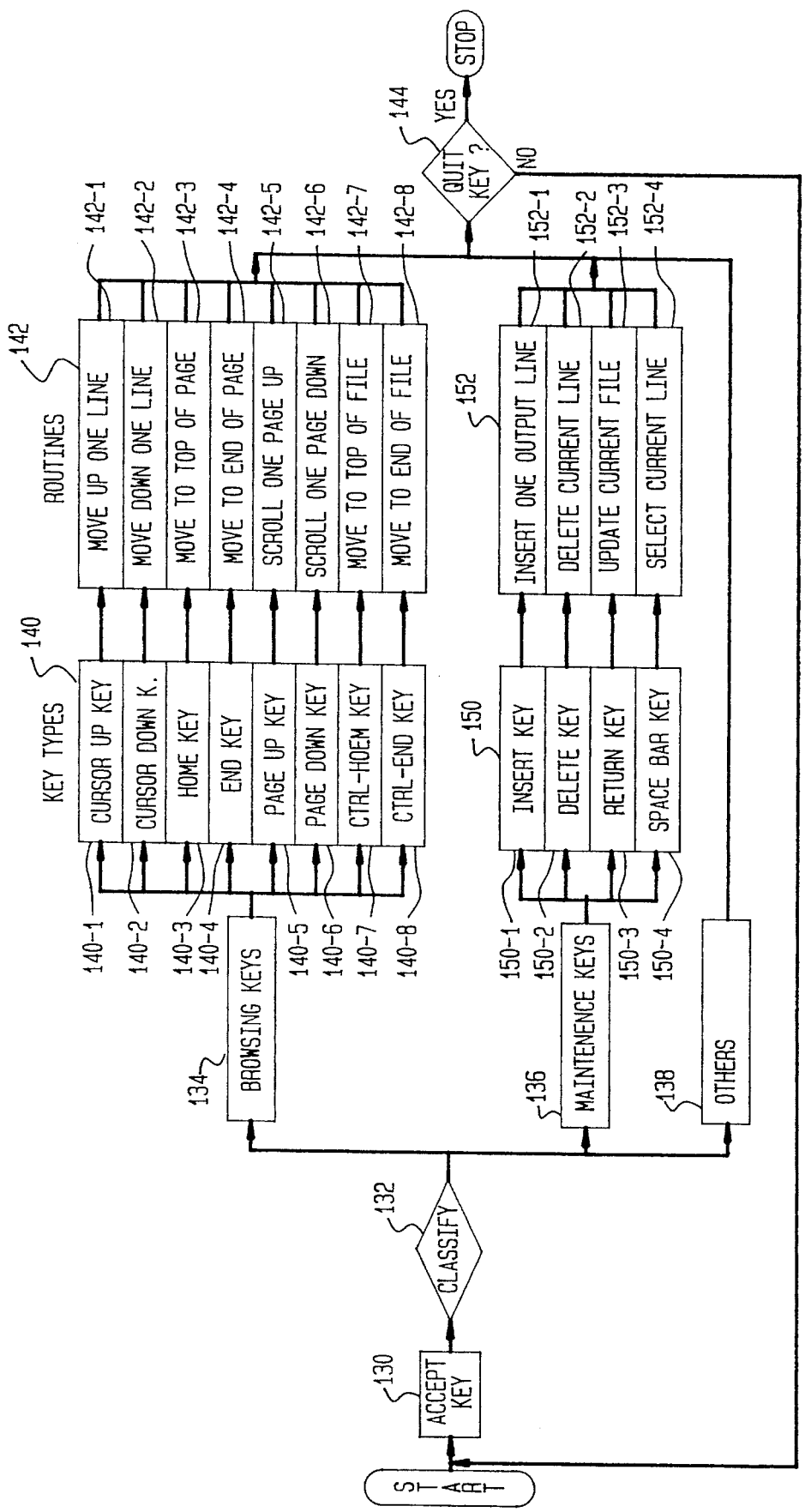
FIG. 12 is a flow chart illustrating the Accept and Process Commands procedure.

Turning now to FIG. 12, the Accept and Process Commands procedure (step 124, FIG. 6) is shown schematically in greater detail. Execution begins at step 130 where a command issued from the user 40 (FIG. 4), via the input device 20 (FIG. 1), or the application 30 (FIG. 4), via the first communication channel 38, (FIG. 4) is accepted by the RMI 36 (FIG. 4). Then, in step 132, the command is compared with a set of commands recognized by the RMI 36 (FIG. 4) to determine which record access procedure has been requested.

Schematically depicted in FIG. 12 are two subsets of commands, browsing commands 134 and maintenance commands 136, which are recognized by the RMI. Also depicted in FIG. 12 is a box for other commands 138. FIG. 12 illustratively shows two tables 140 and 150 of recognized commands. One table 140 depicts the set of commands recognized by the RMI 36 as a request to execute one of the browsing procedures. The other table 150 depicts the set of commands recognized as a request to execute one of the maintenance procedures.

Illustratively, the commands cursor up key, cursor down key, home key, end key, page up key, page down key, control-home key and control-end key are recognized as browsing commands and are shown in locations 140-1 to 140-8 of the table 140. Each command is associated with a corresponding record browsing procedure depicted in the table 142. Like the table 140, the table 142 also has eight locations 142-1 to 142-8, one for each procedure. As depicted in FIG. 12, the procedures: Move Up One Line, Move Down One Line, Move To Top Of Page, Move To End Of Page, Scroll One Page Up, Scroll One Page Down, Display From Top Of File, and Display From End Of File are supported by the RMI 36 (FIG. 4).

Illustratively, when execution passes to step 132, a comparison is made between the received command and the commands depicted in the table 140. If the received command matches a command 140-1 to 140-8 of table 140, the corresponding procedure 42-1 to 142-8 of table 142 is executed. For example, as depicted in FIG. 12, if a home key is received, the commands of table 140 are scanned. Since the command of the location 140-3 is the same as the received command, the procedure of location 142-3 of table 142, Move To Top Of Page, is executed.

FIG. 12 also depicts a second pair of tables 150 and 152 respectively similar to the tables 140, 142. Tables 150, 152 illustratively have four locations each 150-1 to 150-4 and 152-1 to 152-4. The table 150 depicts four commands: insert key, delete key, return key and space bar key, respectively in locations 150-1 to 150-4. Corresponding to each of these commands, table 152 has the procedures Insert One Output Line, Delete Current Line, Update Current Line and Select Current Line in locations 152-1 to 152-4. In the classification step 132, if after searching the commands depicted in table 140 no match is found, the commands of table 150 are compared to the received command for a match. If a match is found with a command of this table, the corresponding procedure of the table 152 is executed. Otherwise, the commands of other tables may be searched. It may be appreciated that the command deciphering steps used for properly identifying browsing or maintenance commands may be extended for any other commands.

After executing the procedure corresponding to the received command, a test is performed at step 144 to see if the quit command has been transmitted by the user 40 (FIG. 4) or the application 30 (FIG. 4). This step may be executed directly after step 132, if no match is found between the received command and the commands of tables 140 and 150. If the transmitted command is the quit command, execution of the Accept and Process Commands procedure ceases and control returns to step 126 (see FIG. 6). Otherwise, execution loops back to step 130 whereby another command may be received from the user 40 (FIG. 4) or application 30 (FIG. 4). Thus, the Accept and Process Commands procedure 124 processes any number of commands issued by the user 40 (FIG. 4) or application 30 (FIG. 4) until it is desired to end the session by issuing the quit command.

The user 40 (FIG. 4) or application 30 (FIG. 4) may request the execution of either browsing procedures 140 (FIG. 12) or maintenance procedures 150 (FIG. 12). Illustratively, eight browsing procedures 140-1 to 140-8 (FIG. 12) and four maintenance procedures 150-1 to 150-4 (FIG. 12) are shown. It may be appreciated that each of the browsing procedures 140-1 to 140-8 (FIG. 12) merely comprises different permutations of selectively setting the current record position and/or altering the displayed page of output lines in the list window 42 (FIG. 4). An exemplary browsing procedure, Move Down One Line, is described in greater detail below. The execution of the four maintenance procedures of table 150 (FIG. 12) are now discussed in greater detail.

Figure 13:
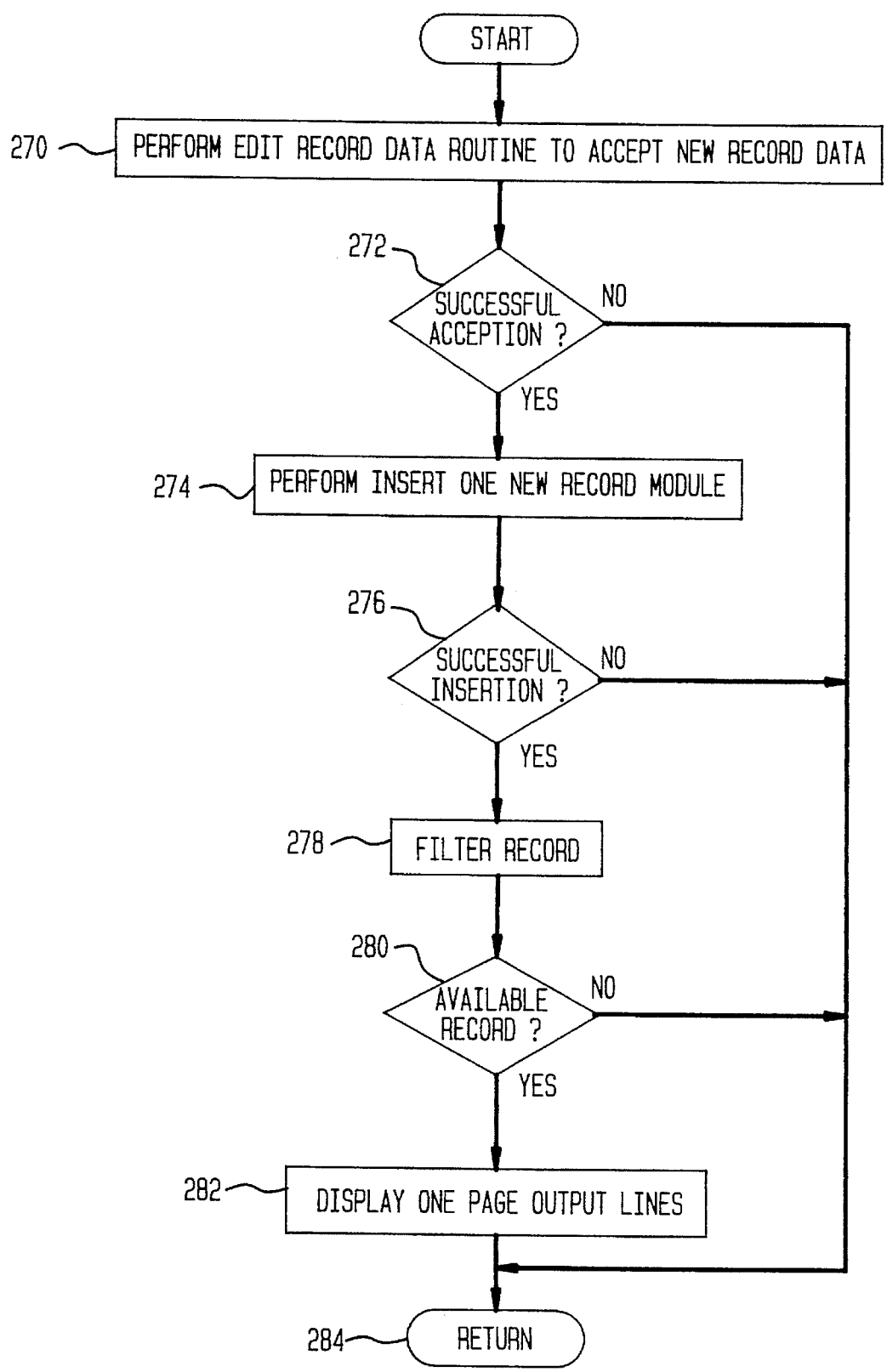
FIG. 13 is a flow chart illustrating the Insert One New Record procedure.

The Insert One Record procedure will be discussed first. Referring now to FIG. 13, the Insert One Record procedure is schematically show. Execution of this procedure begins with step 269 wherein a record buffer, for receiving edited records is cleared. Execution then proceeds to step 270 wherein the record data is edited. As depicted, step 270 requires the execution of a procedure called Edit Record Data which performs the alterations to the data of the record. The procedure will be described in greater detail below. Execution then proceeds with step 272 where a determination is made as to whether the edited record was accepted. The purpose of this determination is to ensure that the user 40 (FIG. 4) or application 30 (FIG. 4) has edited the record correctly. If the record was successfully accepted, execution continues with step 274. Otherwise execution jumps to step 284. In step 274, the Filter Record procedure is executed with the edited record.

Execution then continues with step 276 where it is determined whether the execution of the Filter Procedure was successful. If not, execution jumps to step 284. If the execution of the operation was successful, then execution of the RMI 36 (FIG. 4) continues with step 278.

In step 278 the Insert One New Record program module is pointed to and executed with the newly edited record. As with the other modules, the Insert One New Record module is selected, in accordance with the particular file system format of the database, and executed by the CPU 12 (FIG. 1). This selection process will be discussed in greater detail below. Execution of this operation writes the new record to the location in the database as indicated by the current record position pointer hereinabove described.

Execution then continues with step 280 where a determination is made as to whether the Insert One New Record operation was successful. If not, execution jumps to step 284. If the operation was successful, then execution continues with step 282. Therein, the procedure Display One Page of Output Lines is executed. Thus, the current page of records is redisplayed to reflect the changes made to the database by the execution of the Insert One New Record procedure. Afterwards, in step 284, execution of the Insert One New Line procedure ceases and control returns to the calling procedure.

Figure 14:
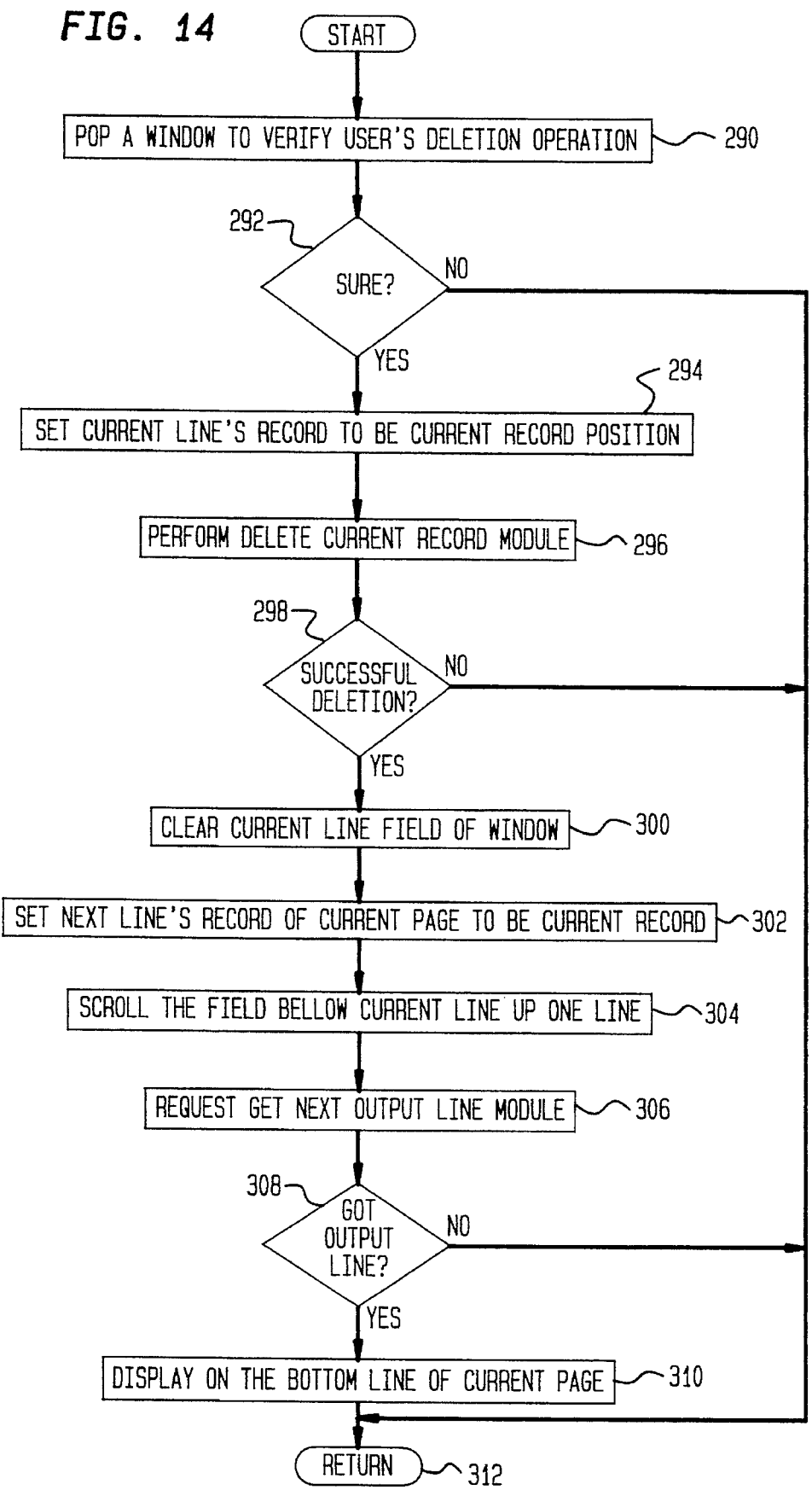
FIG. 14 is a flow chart illustrating the Delete Current Record procedure.

The Delete Current Record procedure 152-2 (FIG. 12) is now discussed. Referring now to FIG. 14, execution begins with step 289 wherein it is determined if the currently highlighted line is blank. If so, this would indicate that no record is selected for deletion and that execution should jump to step 318 and end. Execution continues with step 290 where the user 40 (FIG. 4) is prompted to verify the desire to delete the current record. If a negative answer is received then execution jumps to step 318. Otherwise, if an affirmative answer is received, execution continues with step 294.

In step 294, the appropriate Set Current Record program module for the particular file system format of the database is pointed to and caused to execute by the CPU 12 (FIG. 4). This selection process will be described in greater detail below. This operation sets a file system pointer to point to a particular record of the database. In this case, the pointer is set to point to the record of interest, which is displayed on the highlighted, active line. Execution next proceeds to step 296.

In step 296 the appropriate Delete Current Record program module for the particular database is pointed to and executed. As with the other modules, the Delete Current Record module is selected in accordance with the particular file system format of the database. The selection of the appropriate program module will be discussed in greater detail below. By means of this operation, the record to which the file system pointer points to, i.e., currently highlighted record of interest, is deleted. Execution next continues with step 298 where the CPU 12 (FIG. 1) determines whether the record was properly deleted. If not, execution jumps to step 318 and ends. If so, execution continues with step 300.

In step 300 the current line of the list window 42 (FIG. 4) is un-highlighted. Execution then continues with step 304 where the records displayed in the list window 40 (FIG. 4) are scrolled up one line to overwrite the deleted record. Next, in step 306, the procedure Get Next Output Line (FIG. 9) is executed. Execution then continues with step 308 where a determination is made as to whether the execution of the procedure Get Next Output Line caused the file system pointer to point to the end of the data file. If the end of the file was reached, execution jumps to step 316. If an output line was returned, it is displayed on the bottom line of the list window 42 (FIG. 4) in step 310. Next, step 312 is executed wherein the Get Current Record Position Module, which accords with the particular file system format of the records, is pointed to and caused to execute by the CPU 12 (FIG. 1). This selection process will be discussed in detail below. The Get Current Record Position operation illustratively returns either the location of, or a pointer to, the record of interest. Illustratively, since the last record of interest was deleted, the next record (if there is one, otherwise the previous record) now becomes the record of interest. This position or pointer is then saved in step 314 and the record of interest, whatever it may be, is highlighted in the list window 42 (FIG. 4) in step 316. Execution then proceeds to step 318 where execution of the procedure Delete Current Record ceases and control returns to the calling procedure.

The execution of the procedure Update Current Record 152-3 (FIG. 12) is now discussed. Referring to FIG. 15A, the procedure is schematically shown in detail. Execution begins with step 320 where it is first determined whether there is a record displayed on the active line. If this line is blank (i.e., no record of interest) then execution jumps to step 339 and ends. If there is a record on the active line then step 322 is executed. In this step, the appropriate Set Current Record Position module is pointed to and executed by the CPU 12 (FIG. 1). This selection process is discussed in greater detail below. By performing this operation, a pointer in the file system is updated to point to the record of interest (record of the active line). Execution then continues with step 324 where the appropriate Get Current Record program module, pertaining to the database currently accessed, is pointed to and caused to execute. As with the other modules, the Get Current Record module is selected in accordance with the particular file system format of the database. The selection of the appropriate program module will be discussed in greater detail below. By means of this operation, the record pointed to by the file system pointer, i.e., the currently highlighted record of interest, is retrieved from the database. Execution then proceeds to step 326 where the procedure Edit Record Data is executed. Again, the purpose of this procedure is to permit the alteration of the data of a particular record and is discussed in greater detail below.

Execution next continues with step 328 where it is determined whether the editing of the record was successful (i.e., whether the user 40 or application 30 desires to save the edited record). If not, execution jumps to step 339 where the procedure ends. If the user 40 or application 30 desires to save the edited record, then execution proceeds to step 330.

In step 330 the Filter Record procedure is executed to produce a formatted output line. Subsequently, step 332 is executed where the RMI 36 (FIG. 4) determines whether a record is available for display in the list window 42 (FIG. 4). If not, execution jumps to step 339 and the procedure ends. If a record is available for display, then execution continues with step 334 where the formatted output line is displayed in the list window 42 (FIG. 4). Then in steps 336–338, the current record position is obtained and saved. Since these steps are identical to steps 312–314 (FIG. 14) a discussion of their execution will not be repeated. Thereafter, execution proceeds to step 339 where the procedure ends and control returns to the calling procedure.

The Edit Record Data procedure, called in step 326 (FIG. 15A), is now discussed with reference to FIG. 15B. Execution begins with step 360 where the default data of the record buffer, such as the data currently in the record, is displayed. Next, step 362 is executed where the user 40 may edit the data in the record buffer. Execution then continues with steps 364–366 where the user is prompted as to whether the edited record data in the buffer should be saved. If a positive response is received, then execution jumps to step 368 and a successful edit flag is returned. If a negative response is received, then execution jumps to step 370 and a failed edit flag is returned. Execution, in either case, would then continue in the calling procedure, e.g., step 328 of FIG. 15A.

Figure 16:
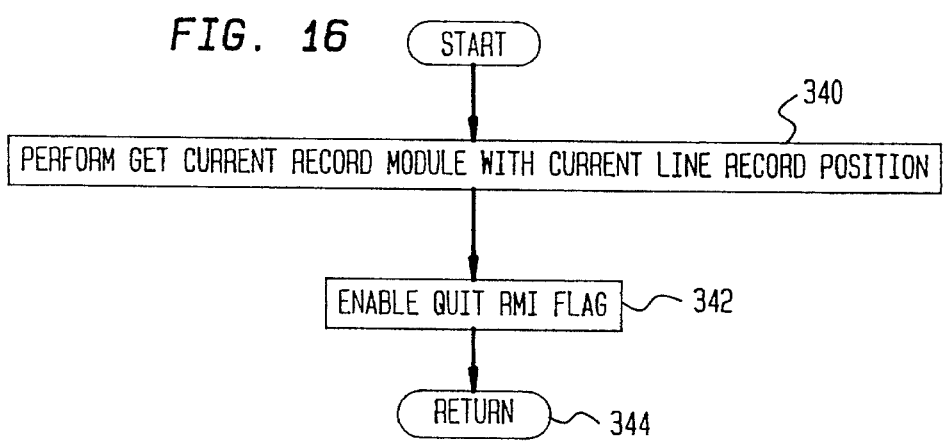
FIG. 16 is a flow chart illustrating the Select Current Record procedure.

The Select Current Record procedure 152-4 (FIG. 12) is now discussed. Turning to FIG. 16, the procedure is schematically shown in greater detail. Execution begins with step 340 where the Set Current Record Position module is pointed to and executed (as discussed in detail above). This sets the file system pointer to point to the record of interest (the record highlighted and displayed on the active line). Then, in step 341 the appropriate Get Current Record program module pertaining to the database currently accessed is pointed to and executed by the CPU 12 (FIG. 1). As with the other modules, the Get Current Record module is selected in accordance with the particular file system format of the database. The selection of the appropriate program module will be discussed in greater detail below. By means of this operation, the record of the current line position is retrieved from the database. Execution the proceeds to step 342 where a RMI 36 (FIG. 4) quit flag is enabled. Thus, from this point on the user 40 (FIG. 4) or application 30 (FIG. 4) may end an RMI session. Thereafter, execution proceeds to step 344 where execution of the Select Current Record procedure is ended and control returns to the calling procedure.

Referring now to FIG. 17A, the Move Down One Line browsing procedure 142-2 (FIG. 12) is now discussed. Execution begins with step 380 wherein it is determined whether the active line is the last line of the list window 42 (FIG. 4). If so, execution jumps to step 388. Otherwise, execution proceeds with step 382.

In steps 382, the active line is unhighlighted, then, in step 384 the next line in the window becomes the active line (by adding 1 to the active line variable). Next, step 386 is executed wherein the new active line is highlighted. This effect may be better seen with reference to FIG. 17B.

In FIG. 17B, a before 392 and after 394 state of the list window 42 (FIG. 4) is depicted. As can be seen, prior to execution, the line 392-1 "yyyyyy" is highlighted. After execution, the line 394-1 "zzzzzzz" is highlighted. Referring once again to FIG. 17A, after executing step 386, step 390 is executed and control returns to the calling procedure. Similarly, after executing step 388, step 390 is executed.

In step 388, no line is currently in the window below the active line. As such, the data in the window must be scrolled up one line, necessitating a call to the procedure Scroll Up One Line. Turning now to FIG. 17C, the procedure Scroll Up One Line will be explained. Execution begins in line 400 where it is determined whether the end of file had been reached previously. If so, execution jumps to line 418 and returns to the current procedure (e.g., step 388 of FIG. 17A). If the end of file has not been reached, then execution continues with step 402.

In step 402, the procedure Get Next Output Line is executed. The execution of this procedure is the same as previously described above and will not be repeated for purposes of brevity. Execution then proceeds to step 404 wherein again it is determined if the end of file had been reached. If so, as with step 400, execution jumps to line 418. Otherwise, execution proceeds to step 406.

In step 406, the active line, i.e, the line that contains the record of interest in the window, is unhighlighted. Next, in step 408, the displayed page of records in the list window 42 (FIG. 4) is scrolled up one line. In addition, the correspondence between the location of each record in the list window and their respective positions within the database are updated to reflect this change.

Execution proceeds to step 410 wherein the data retrieved from step 402 is displayed on the last line of the list window 42 (FIG. 4). Next, step 412 is executed wherein the appropriate Get Current Record position module is pointed to by the CPU and executed. Again, execution of this module has been described in detail above. The position retrieved in step 412 is then saved in step 414. Finally, execution proceeds to step 416 wherein the active line is once again highlighted. At this point, it is important to note that although the active line has not changed in the list window, a data stored in this line has been replaced. Finally, in step 418, execution of the procedure Scroll Up One Line ceases and returns to the current program, i.e., step 390 of FIG. 17A.

Referring now to FIG. 17D, the effect of the procedure Scroll Up One Line is shown in greater detail. Depicted in FIG. 17D is an exemplary database file 420 and three states of the list window 42 (FIG. 4) referred to as 422, 424 and 426. In the state referred to as 422, records 5–11 are initially displayed on lines 1-7 of the list window. The active line is line 7. FIG. 424 depicts the state of the list window 42 after executing step 408 of FIG. 17C. As depicted, records 5–10 are moved from lines 2–7 to lines 1–6 of the list window 42. Finally, stage 426 depicts the list window 42 after executing step 410 of FIG. 17C. As can be seen, record 11 is placed on line 7 of the list window. Hence, the active line now corresponds to the record of interest which is record number 11.

In causing the execution of the aforementioned procedures, the RMI 36 (FIG. 4) will point to and execute at least one data access operation program module. As stated before, the particular program module will be selected based on the desired operation and the file system format of the database. The determination of the desired operation is fixed by the procedure executed. For instance, the Get First Output Line procedure 168 (FIGS. 7,8) will point to and cause the execution of the operation Get First Record 190 (FIG. 8). The selection of the correct program module, on the other hand, will vary based on the file system. This selection process is now discussed.

Referring now to FIG. 18, a generic flow diagram for each of the basic database access operations is illustrated. Thus, each database access operation call involves the following steps. Execution begins with step 260 wherein the file system format of the database, containing the record of interest, is determined. This step may be carried out in a number of ways including prompting the user 40 (FIG. 4) or application 30 (FIG. 4) to specify the file system format of the database.

Execution then continues with step 262 in which the RMI 36 (FIG. 4) points to the program module 262-1, 262-2, 262-3, . . . , 262-N of the appropriate file system for carrying out the operation. This selection accords with the determination of step 260. The RMI 36 (FIG. 4) then causes this program module to be executed. When execution of the program module is complete, the CPU 12 (FIG. 1) returns a message to the RMI 36 (FIG. 4). This message may be an indication that the attempted execution failed, an indication that the attempted execution succeeded or a retrieved record resulting from the execution. After receiving this message, control proceeds to step 264 where execution control returns to the calling procedure.

Finally, the aforementioned discussion is intended merely to illustrate the invention. Numerous other embodiments may be devised by those with skill in the art without departing from the spirit of the following claims.

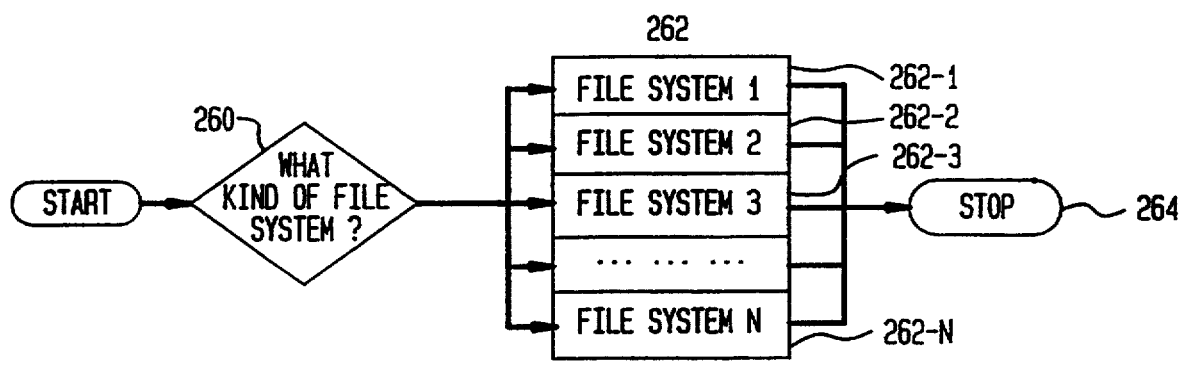

What is claimed is:

1. A data processing machine having:
   a plurality of databases, each database being organized into records and being maintained in one of a plurality of file system formats;
   a processor configured to execute record access procedures, the record access procedures comprising browse functions and file maintenance functions and further comprising one or more database access operations to be performed on a database according to one of the system formats each file maintenance database operation of each file system format having a distinct program module; and
   storage means for storing the databases and the record access procedures;
   the data processing machine comprising:
   (a) means for generating a command requesting execution of a record access procedure for a particular record residing in one of the databases, the command being selected from a universal command set which is independent of any of the the system formats;
   (b) a record maintenance interface comprising:
      (i) an accept command module configured to receive the command;
      (ii) a process command module connected to the accept command module configured to:
         A. determine if the command is either one of the browse functions or one of the file maintenance functions;
         B. if the command is determined to be one of the file maintenance functions, cause the processor to execute the requested record access procedure, including pointing to and executing a program module corresponding to the file system format of the database in which the particular document resides;
         C. if the command is determined to be one of the browse functions, cause the processor to execute the browse function, including pointing to and executing a program module corresponding to the file system format of the database in which the particular document resides; and
         D. communicate a status of the command to the generating means;
      (iii) a formatting module connected to the process command module configured to selectively extract data from certain predetermined information fields of a record on which one of either the file maintenance and browse functions was performed and to assemble an output line including information from the predetermined information fields for communication with the generating means; and
      (iv) a quit module configured to exit the data processing machine from the record maintenance interface.

2. The data processing machine of claim 1 wherein the generating means comprises a user operated input device and a display system.

3. The data processing machine of claim 1 wherein the generating means is an application program.

4. The data processing machine of claim 1 wherein the file maintenance function comprises:

inserting one record into a database;

deleting one record from a database;

updating a record of a database; and selecting a record from a database.

5. The data processing machine of claim 4, wherein the record maintenance interface is further for allowing an "updating a record of a database" procedure to be executed on a record accessed by a browse function.

6. The data processing machine of claim 1 wherein the storage means maintains a plurality of distinct commands, each one of the distinct commands being associated with one record access procedure in said storage means, and the record management interface being configured to match each of the plurality of distinct commands to a command selected from the universal command set, and to execute a record access procedure associated with a selected distinct command.

7. The data processing machine of claim 1, wherein the file browsing functions comprise:

move up one record;

move down one record;

move to top of page;

move to bottom of page;

scroll up one page;

scroll down one page;

display from top of file; and display from bottom of file.

8. The data processing machine of claim 1, wherein the formatting module is user controlled.

9. The data processing machine of claim 1, wherein the formatting module is controlled by an application program.

10. The data processing machine of claim 1, wherein the processor executes the requested record access procedure without altering the file system format in which the particular document is maintained.

11. The data processing machine of claim 1, wherein the processor executes the requested record access procedure for both file maintenance functions and file browsing functions.

12. The data processing machine of claim 1, wherein the process command module is configured to consult the universal command set to determine if the command is either one of the browse functions or one of the file maintenance functions.

13. The data processing machine of claim 1, wherein the process command module is configured to determine if the command is other than one of the browse functions or one of the file maintenance functions.

14. A method of maintaining a plurality of databases in a memory of a data processing machine, each database being organized into records and being maintained in one of a plurality of file system formats, each file system format having a distinct set of record access procedures residing in the memory, the record access procedures comprising at least file maintenance functions and browse functions, and having one or more database access operations to be performed on a database according to one of the the system formats, each file maintenance database operation having a distinct program module, comprising the steps of:

(a) providing a universal command set, each command in the set corresponding to a record access procedure;

(b) selecting one of the universal commands corresponding to a particular record access procedure;

(c) accepting the selected command;

(d) comparing the selected command with the universal command sets, (e) based on the comparison, determining whether the selected command is either one of the file maintenance functions or one of the browse functions;

(f) if the selected command is determined to be a file maintenance function, pointing to a location in the memory where a record access procedure resides corresponding to the selected command and directing the processor to execute the record access procedure;

(g) if the selected command is determined to be a browse function pointing, to a locating in the memory where a record access procedure resides corresponding to the selected command, and directing the processor to execute the record access procedure; and (h) formatting an accessed record after the processor executes the record access procedure.

15. The method of claim 14, wherein the step of formatting comprises:

(a) extracting data from certain predetermined fields of a record; and (b) assembling an output line including the extracted data.

16. The method of claim 14, further including the step of communicating an output relating to a status of the executed procedure.

17. The method of claim 14, wherein the file maintenance functions include updating, and updating may be executed on a record accessed by a browse function record access procedure.

18. The method of claim 17, wherein the file maintenance function is executed by the same processor as the browse function.

* * * * *

UNITED STATES PATENT AND TRADEMARK OFFICE
CERTIFICATE OF CORRECTION

PATENT NO. : 5,522,066
DATED : May 28, 1996
INVENTOR(S) : Feng-Chang LU

It is certified that error appears in the above-indentified patent and that said Letters Patent is hereby corrected as shown below:

Delete drawing sheets 6-10, and 13-16, substitute therefor the Drawing sheets consisting of Figs. 6-10, and Figs. 13, 14, 15A, 15B, 16 and 17A, as shown on the attached pages.

Add the drawing sheets, consisting of Figs. 17B, 17C, 17D and Fig. 18, as shown on the attached pages.

Signed and Sealed this

First Day of October, 1996

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,522,066

DATED : May 28, 1996

INVENTOR(S) : Feng-Chang LU

It is certified that error appears in the above-identified patent and that said Letters Patent is hereby corrected as shown below:

Replace Fig. 6 on current sheet 6 with:

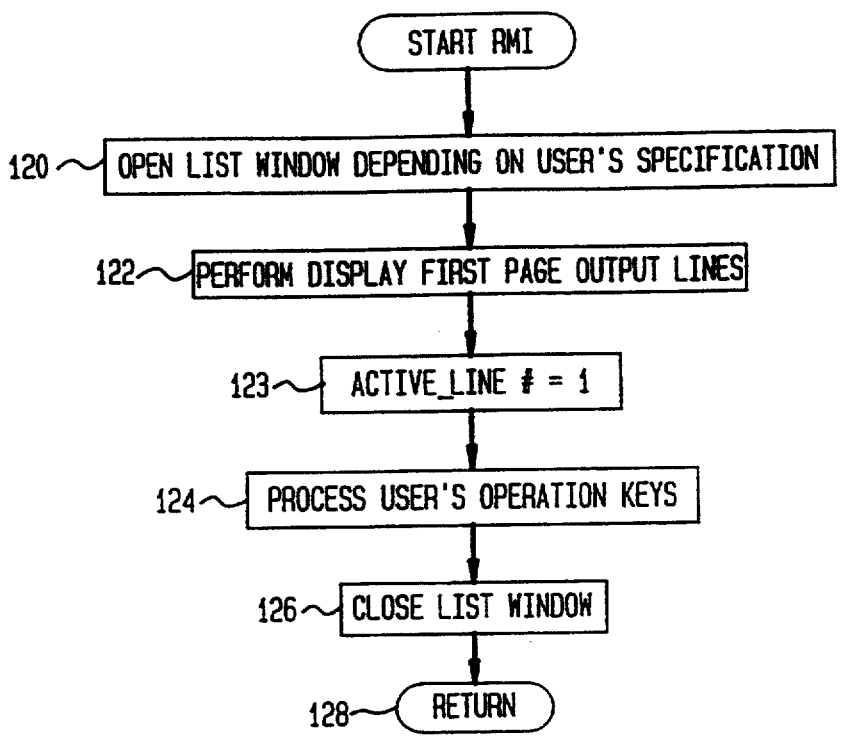

FIG. 6

UNITED STATES PATENT AND TRADEMARK OFFICE
CERTIFICATE OF CORRECTION

PATENT NO. : 5,522,066

DATED : May 28, 1996

INVENTOR(S) : Feng-Chang LU

It is certified that error appears in the above-identified patent and that said Letters Patent is hereby corrected as shown below:

Replace Fig. 7 on current sheet 7 with:

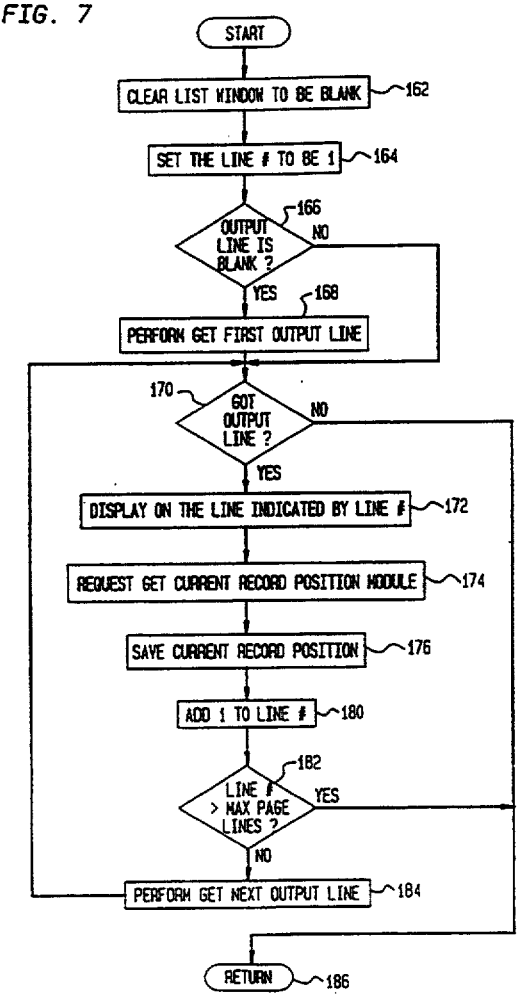

FIG. 7

UNITED STATES PATENT AND TRADEMARK OFFICE
CERTIFICATE OF CORRECTION

PATENT NO. : 5,522,066
DATED : May 28, 1996
INVENTOR(S) : Feng-Chang LU

It is certified that error appears in the above-identified patent and that said Letters Patent is hereby corrected as shown below:

Replace Fig. 8 on current sheet 8 with:

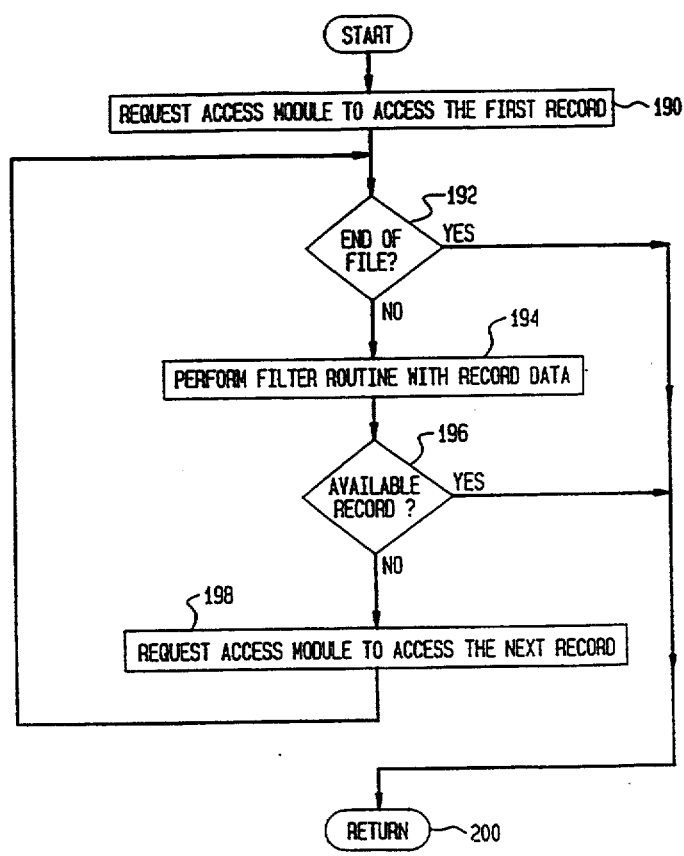

FIG. 8

UNITED STATES PATENT AND TRADEMARK OFFICE
CERTIFICATE OF CORRECTION

PATENT NO. : 5,522,066
DATED : May 28, 1996
INVENTOR(S) : Feng-Chang LU

It is certified that error appears in the above-identified patent and that said Letters Patent is hereby corrected as shown below:

Replace Fig. 9 on current sheet 9 with:

FIG. 9

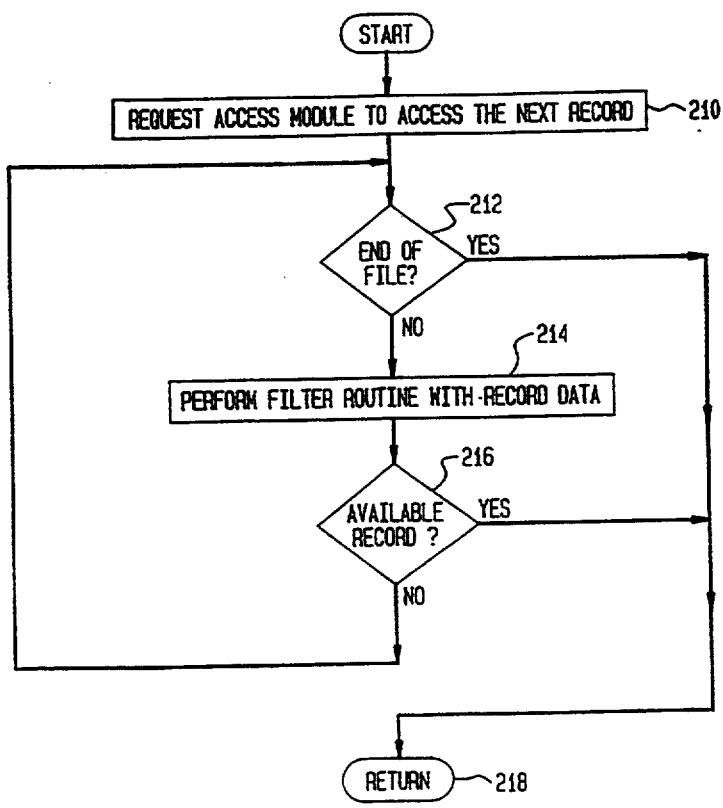

UNITED STATES PATENT AND TRADEMARK OFFICE
CERTIFICATE OF CORRECTION

PATENT NO. : 5,522,066

DATED : May 28, 1996

INVENTOR(S) : Feng-Chang LU

It is certified that error appears in the above-identified patent and that said Letters Patent is hereby corrected as shown below:

Replace Fig. 10 on current sheet 10 with:

FIG. 10

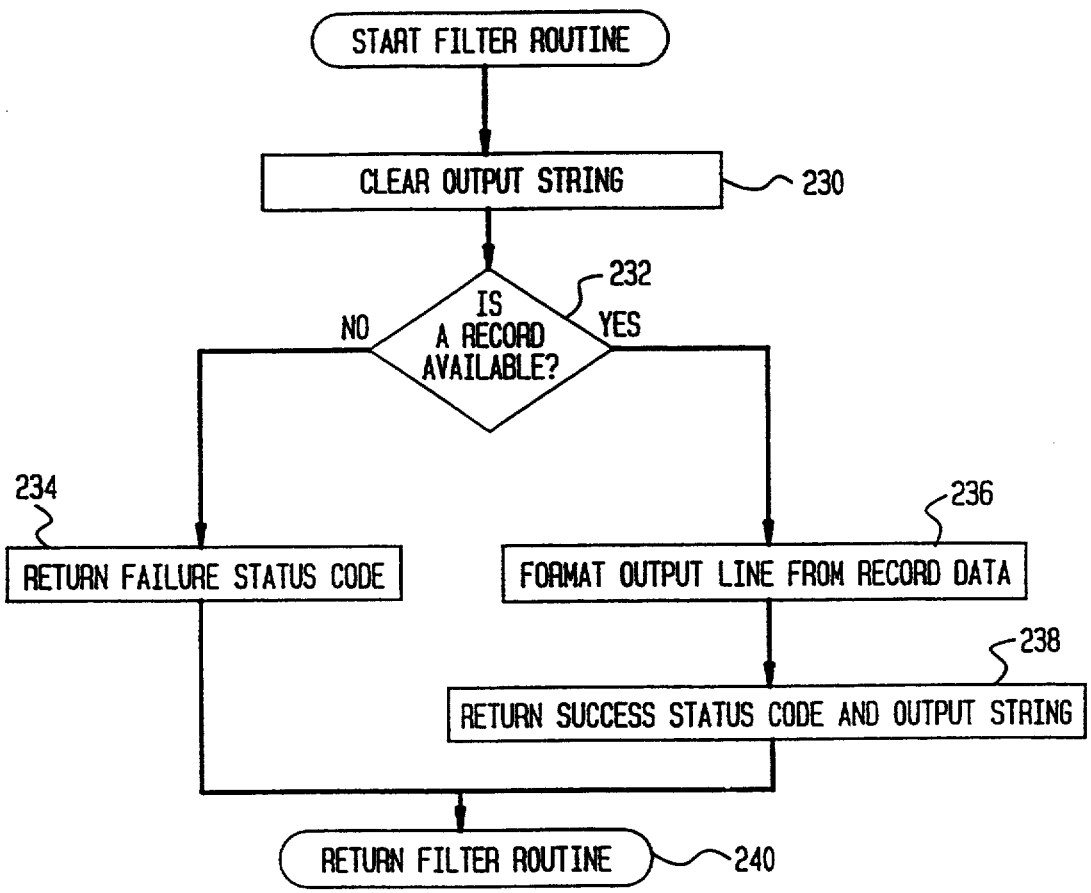

UNITED STATES PATENT AND TRADEMARK OFFICE
CERTIFICATE OF CORRECTION

PATENT NO. : 5,522,066
DATED : May 28, 1996
INVENTOR(S) : Feng-Chang LU

It is certified that error appears in the above-identified patent and that said Letters Patent is hereby corrected as shown below:

Replace Fig. 13 on current sheet 13 with:

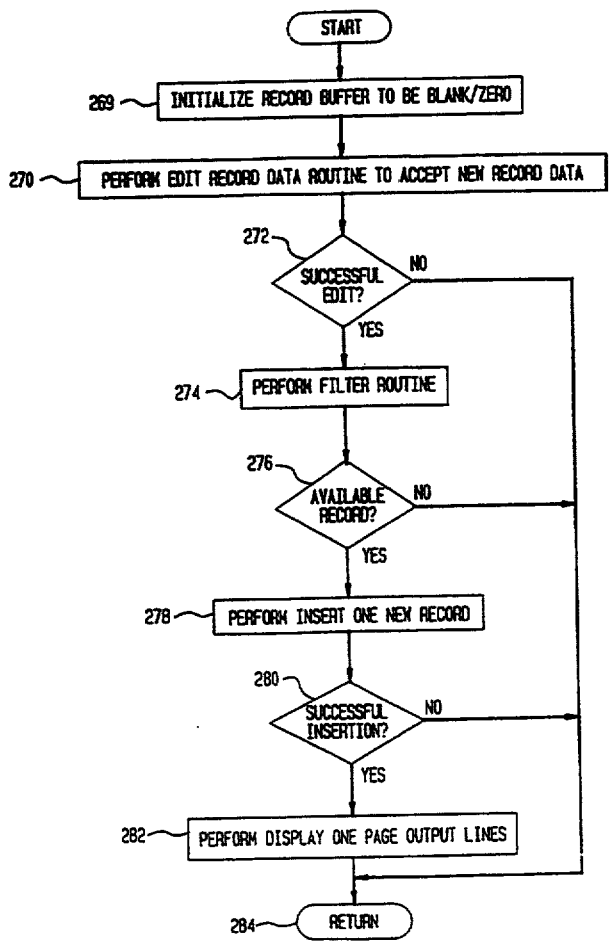

UNITED STATES PATENT AND TRADEMARK OFFICE
CERTIFICATE OF CORRECTION

PATENT NO. : 5,522,066

DATED : May 28, 1996

INVENTOR(S) : Feng-Chang LU

It is certified that error appears in the above-identified patent and that said Letters Patent is hereby corrected as shown below:

Replace Fig. 14 on current sheet 14 with:

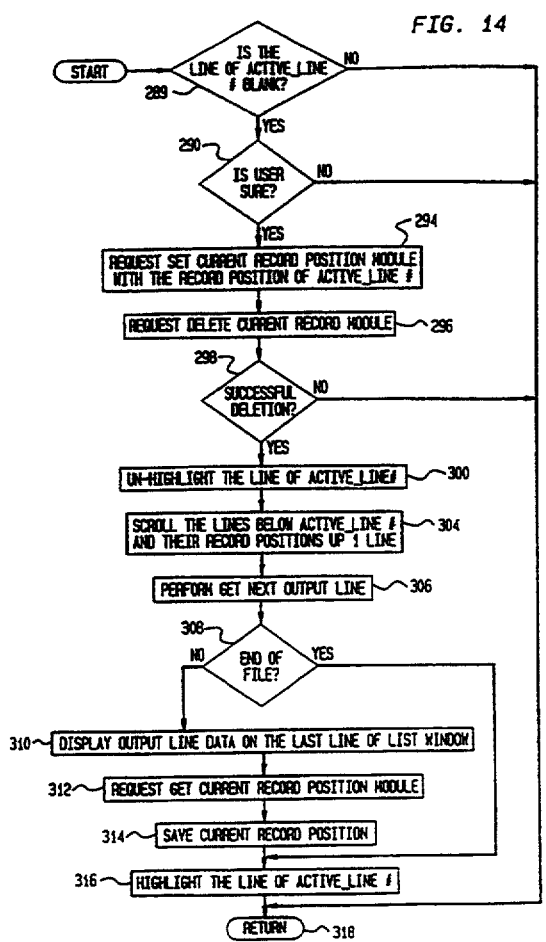

UNITED STATES PATENT AND TRADEMARK OFFICE
CERTIFICATE OF CORRECTION

PATENT NO. : 5,522,066

DATED : May 28, 1996

INVENTOR(S) : Feng-Chang LU

Figure 15:
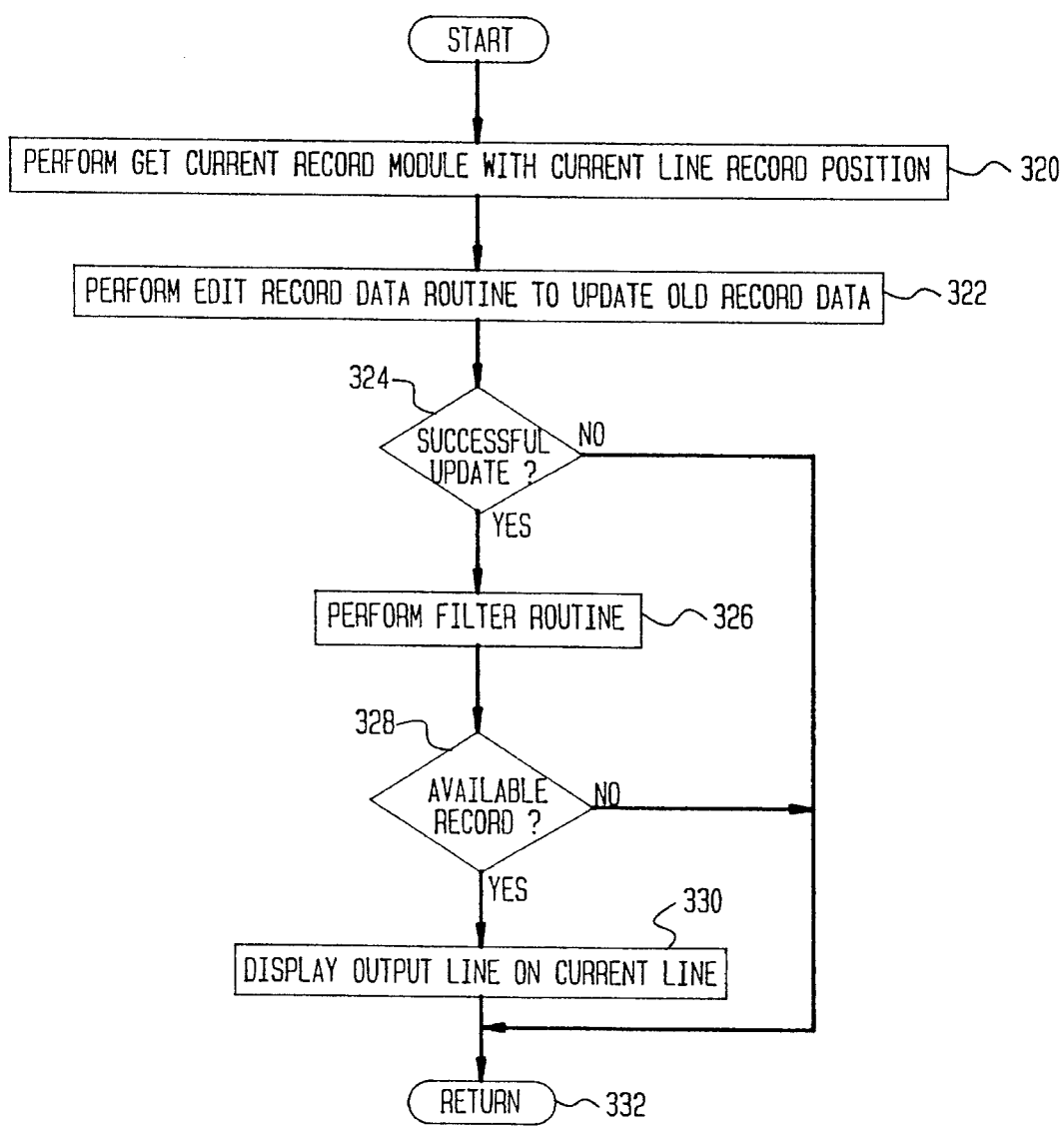
FIG. 15A is a flow chart illustrating the Update Current Record procedure.
FIG. 15B is a flow chart illustrating the Edit Record procedure.

It is certified that error appears in the above-identified patent and that said Letters Patent is hereby corrected as shown below:

Replace Fig. 15 on current sheet 15 with Fig. 15A:

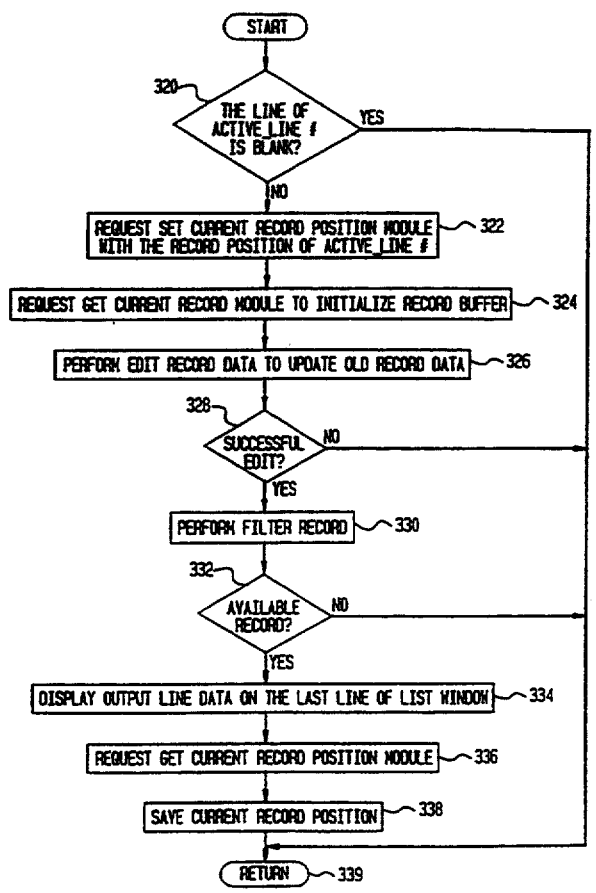

UNITED STATES PATENT AND TRADEMARK OFFICE
CERTIFICATE OF CORRECTION

PATENT NO. : 5,522,066
DATED : May 28, 1996
INVENTOR(S) : Feng-Chang LU

It is certified that error appears in the above-identified patent and that said Letters Patent is hereby corrected as shown below:

Add the following sheet:

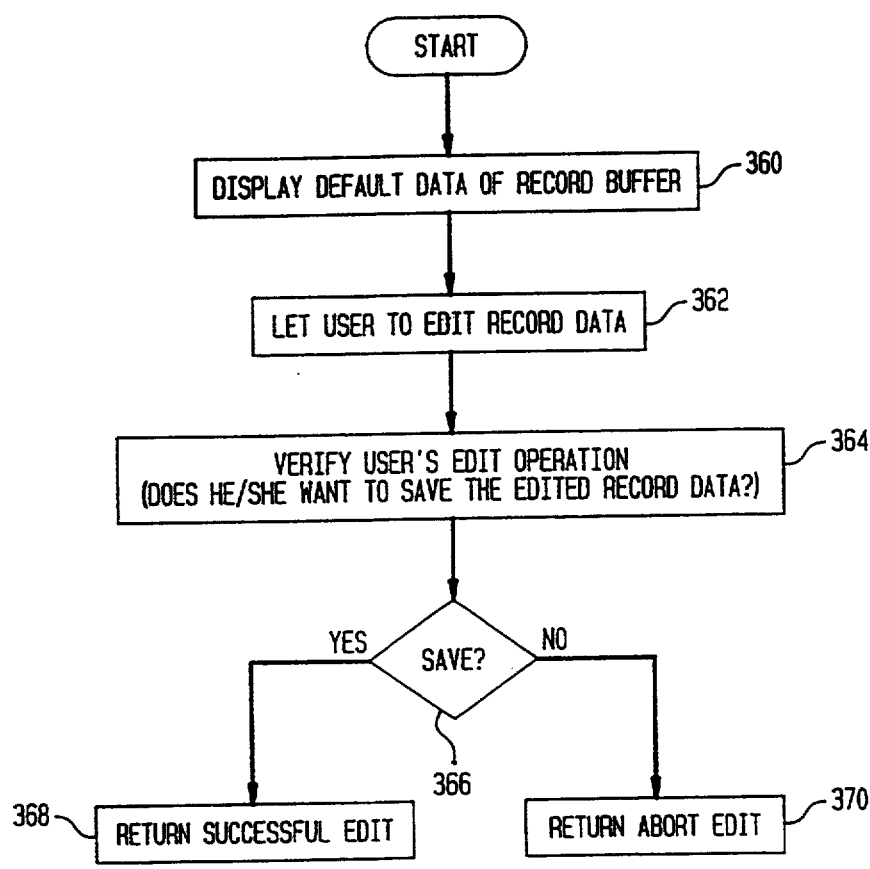

UNITED STATES PATENT AND TRADEMARK OFFICE
CERTIFICATE OF CORRECTION

PATENT NO.  : 5,522,066
DATED       : May 28, 1996
INVENTOR(S) : Feng-Chang LU

It is certified that error appears in the above-identified patent and that said Letters Patent is hereby corrected as shown below:

Replace Fig. 16 on current sheet 15 with:

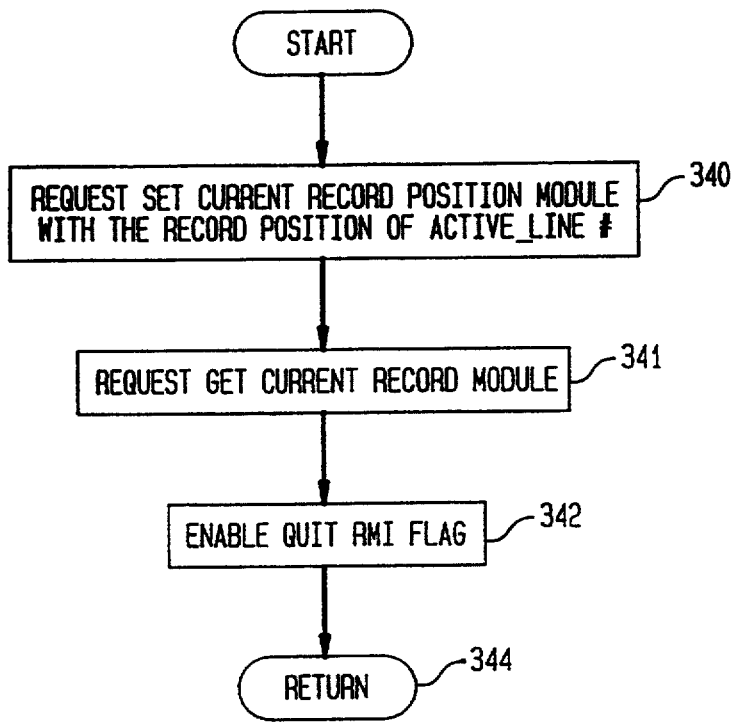

UNITED STATES PATENT AND TRADEMARK OFFICE
CERTIFICATE OF CORRECTION

PATENT NO. : 5,522,066
DATED : May 28, 1996
INVENTOR(S) : Feng-Chang LU

Figure 17:
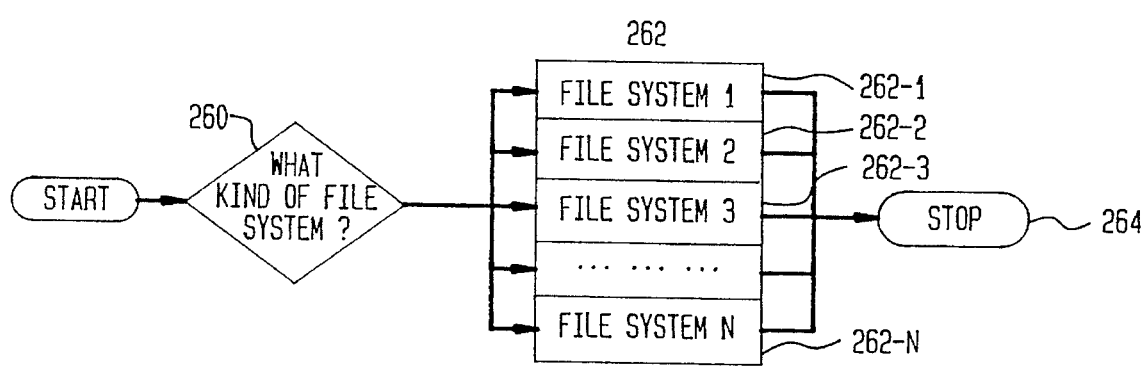
FIG. 17A is a flowchart illustrating the Move Down One Line procedure.
FIG. 17B illustrates the effect of moving down one line on the list window as per the Move Down One Line procedure.
FIG. 17C is a flowchart illustrating the Scroll Up One Line procedure.
FIG. 17D illustrates the effect of moving down one line on the list window as per the Scroll Up One Line procedure.

It is certified that error appears in the above-identified patent and that said Letters Patent is hereby corrected as shown below:

Replace Fig. 17 on current sheet 16 with 17A:

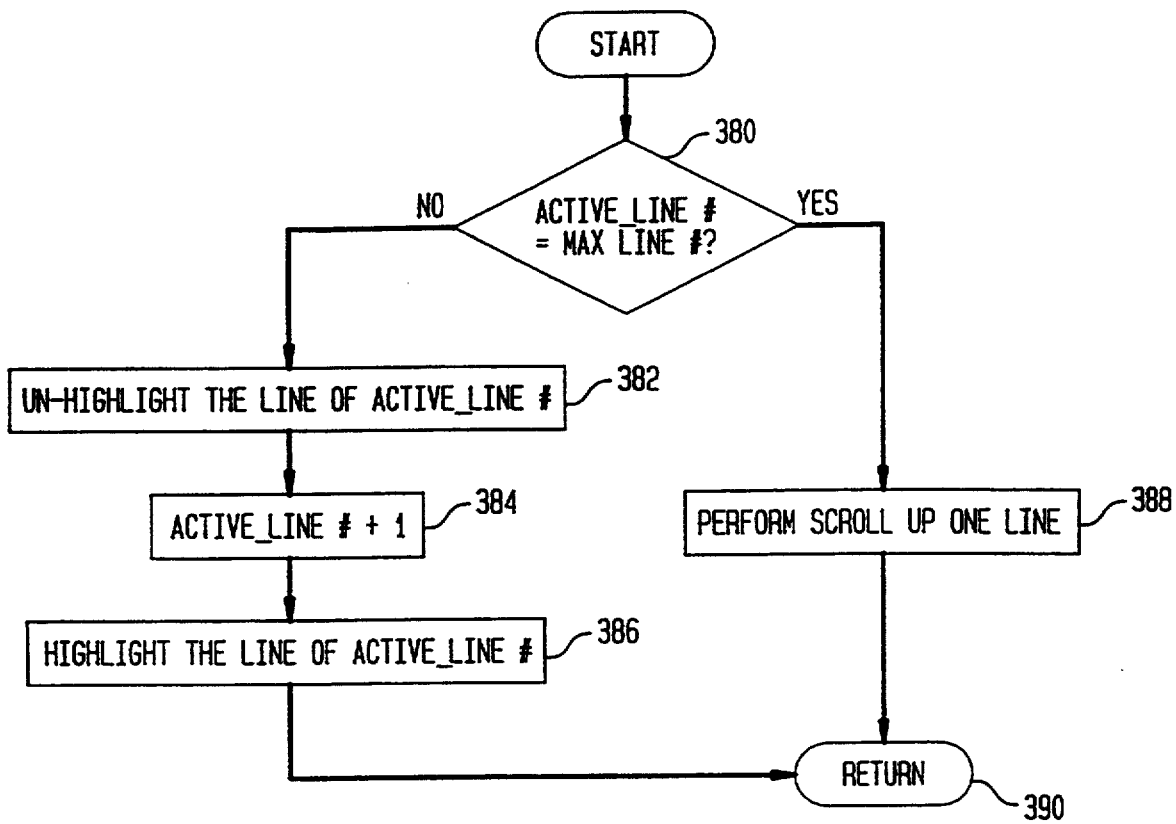

FIG. 17A

UNITED STATES PATENT AND TRADEMARK OFFICE
CERTIFICATE OF CORRECTION

PATENT NO. : 5,522,066
DATED : May 28, 1996
INVENTOR(S) : Feng-Chang LU

It is certified that error appears in the above-identified patent and that said Letters Patent is hereby corrected as shown below:

Add the following sheet:

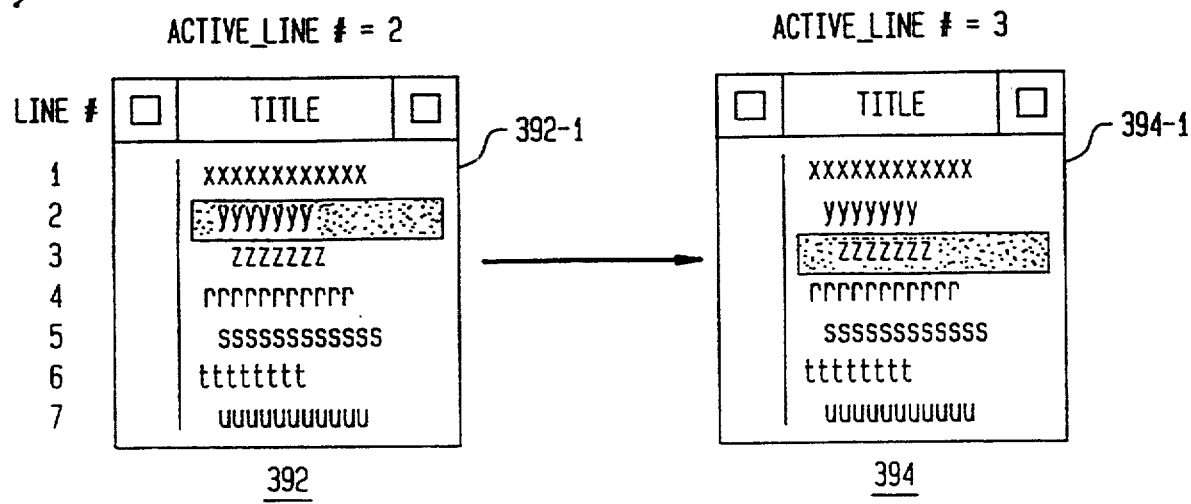

FIG. 17B

UNITED STATES PATENT AND TRADEMARK OFFICE
CERTIFICATE OF CORRECTION

PATENT NO. : 5,522,066

DATED : May 28, 1996

INVENTOR(S) : Feng-Chang LU

It is certified that error appears in the above-identified patent and that said Letters Patent is hereby corrected as shown below:

Add the following sheet:   FIG. 17C

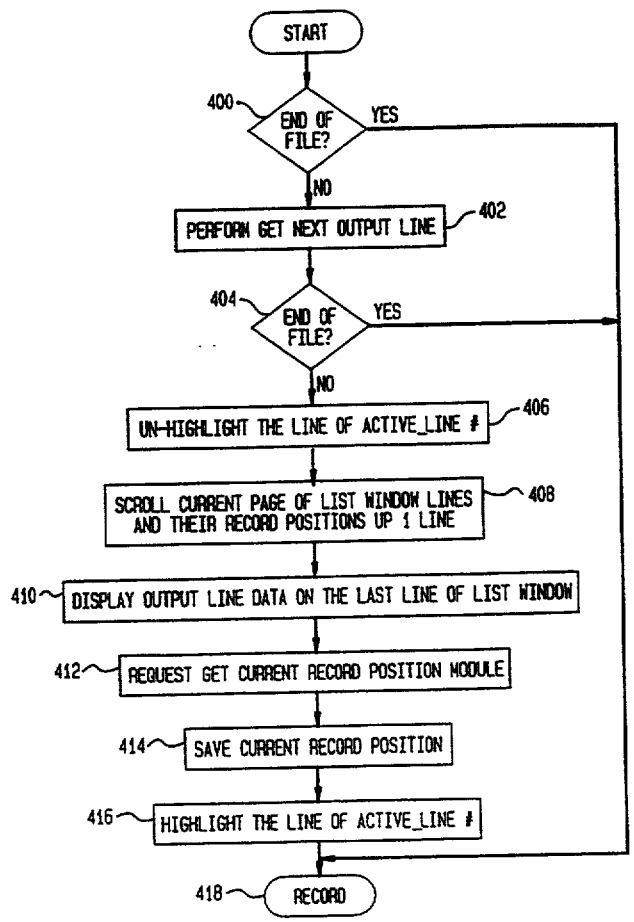

UNITED STATES PATENT AND TRADEMARK OFFICE
CERTIFICATE OF CORRECTION

PATENT NO. : 5,522,066

DATED : May 28, 1996

INVENTOR(S) : Feng-Chang LU

It is certified that error appears in the above-identified patent and that said Letters Patent is hereby corrected as shown below:

Add the following sheet:

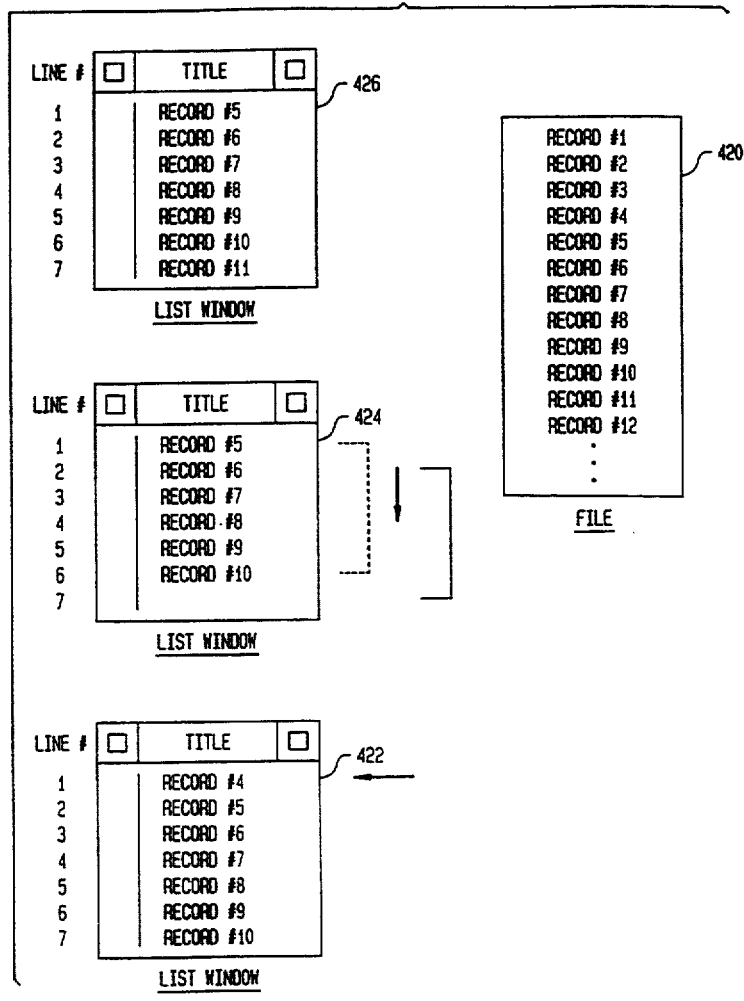

FIG. 17D

UNITED STATES PATENT AND TRADEMARK OFFICE
CERTIFICATE OF CORRECTION

PATENT NO. : 5,522,066

DATED : May 28, 1996

INVENTOR(S) : Feng-Chang LU

It is certified that error appears in the above-identified patent and that said Letters Patent is hereby corrected as shown below:

Add Fig. 18:

FIG. 18